US012553475B2

(12) United States Patent
Perrotin et al.

(10) Patent No.: US 12,553,475 B2
(45) Date of Patent: Feb. 17, 2026

(54) CONDUCTIVE ASSEMBLY WITH REINFORCED BASE PLATE

(71) Applicant: AKTIEBOLAGET SKF, Gothenburg (SE)

(72) Inventors: Thomas Perrotin, Saint Roch (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 163 days.

(21) Appl. No.: 18/238,759

(22) Filed: Aug. 28, 2023

(65) Prior Publication Data

US 2025/0043829 A1    Feb. 6, 2025

Related U.S. Application Data

(60) Provisional application No. 63/530,619, filed on Aug. 3, 2023.

(51) Int. Cl.
*F16C 41/00* (2006.01)
(52) U.S. Cl.
CPC .................. *F16C 41/002* (2013.01)
(58) Field of Classification Search
CPC .. F16C 41/002; F16C 33/586; F16C 2202/32; F16C 2380/26; F16C 19/06
USPC .......................................................... 361/221
See application file for complete search history.

(56) References Cited

U.S. PATENT DOCUMENTS

| | | | |
|---|---|---|---|
| 3,271,723 A | 9/1966 | Willing | |
| 3,757,164 A | 9/1973 | Binkowski | |
| 5,812,908 A * | 9/1998 | Larocca ............... | H01R 13/035 399/90 |
| 7,339,777 B2 | 3/2008 | Barnard et al. | |
| 8,169,766 B2 | 5/2012 | Oh et al. | |
| 9,464,672 B2 | 10/2016 | White | |
| 10,253,818 B1 | 4/2019 | Ince et al. | |
| 11,309,775 B2 | 4/2022 | Hubert et al. | |
| 2019/0296617 A1* | 9/2019 | Hubert ................... | H01R 39/64 |

(Continued)

FOREIGN PATENT DOCUMENTS

JP    H11218143 A    8/1999
JP    2002295492 A    10/2002

(Continued)

*Primary Examiner* — Sreeya Sreevatsa
(74) *Attorney, Agent, or Firm* — J-TEK LAW PLLC; Scott T. Wakeman; Mark A. Ussai

(57) ABSTRACT

An electrically conductive assembly prevents current flow through the raceways of a bearing and includes a conductive base plate having a centerline and including an annular main body with an inner and outer radial ends. One or more mounting lugs extend radially outwardly from the outer radial end of the main body and are connectable with the exterior surface of an outer member to secure the conductive assembly to the outer member at a position spaced axially from the bearing. The main body may be flat and include one or more stiffening flanges extending axially from and at least partially circumferentially about the inner perimeter of the main body and/or the outer perimeter of the main body and/or the outer perimeter of the mounting lugs. Alternatively, the main body is formed as a circular hub having a bore for receiving the conductor and each mounting lug includes two stiffening ribs.

18 Claims, 21 Drawing Sheets

(56) References Cited

U.S. PATENT DOCUMENTS

| | | |
|---|---|---|
| 2020/0263734 A1 | 8/2020 | Kottapalli et al. |
| 2021/0293279 A1* | 9/2021 | Hubert .................. F16C 33/586 |
| 2021/0310518 A1 | 10/2021 | Berruet et al. |
| 2021/0310520 A1 | 10/2021 | Arnault et al. |
| 2021/0364040 A1 | 11/2021 | Arnault et al. |
| 2021/0364041 A1 | 11/2021 | Berruet et al. |

FOREIGN PATENT DOCUMENTS

| | | |
|---|---|---|
| JP | 3654921 B2 | 6/2005 |
| JP | 2009243695 A | 10/2009 |

* cited by examiner

CONDUCTIVE ASSEMBLY WITH REINFORCED BASE PLATE

CROSS-REFERENCE

This application claims priority to U.S. Provisional Patent Application No. 63/530,619 filed on Aug. 3, 2023, the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current resulting from charge accumulating on a shaft, and thereby prevent such current from passing through the bearing. These devices often include an annular retainer with an outer rim, which is frictionally engaged with the bore of a housing or hub at a position adjacent to the bearing, and a plurality of conductive fibers attached to the retainer and spaced circumferentially about the entire outer surface of the shaft to form a relatively solid ring of fibers. As such, current passes from the shaft through the fibers and the retainer, and thereafter into the housing.

However, a certain amount of axial space is required to install the conductive assembly within the housing bore, particularly since the conductive assembly should be spaced from the bearing by at least a certain distance to avoid any conductive fibers that are detached during use from entering into and damaging the bearing. This space requirement reduces the axial compactness of the shaft and housing/hub. Also, heat generated within the electrical machine may cause differences in thermal expansion of the bearing, bore and/or conductive assembly. As such, the retainer rim may disengage from the bore allowing the conductive assembly to axially displace or create increased radial interference between the conductive fibers and the shaft, leading to substantially increased friction.

SUMMARY OF THE INVENTION

In one aspect, the present invention is an electrically conductive assembly for preventing current flow through the raceways of a bearing having an inner ring disposed about a shaft and an outer ring disposed within a bore of an outer member, the shaft or the outer member being rotatable about a central axis through the shaft, the outer member having an exterior mounting surface spaced radially outwardly from the bore. The conductive assembly comprises an annular base plate formed of a conductive material, having a centerline coaxial with the central axis and including an annular main body with an inner radial end and an outer radial end, and at least one integral mounting lug extending radially outwardly from the outer radial end of the main body. The at least one lug is connectable with the mounting surface of the outer member to secure the conductive assembly to the outer member at a position spaced axially from the bearing. At least one stiffening flange extends axially from and at least partially circumferentially about the inner radial end of the plate main body, the outer radial end of the plate main body and/or an outer perimeter of the at least one mounting lug. Further, an inner annular conductor is connected with the base plate and has an inner radial end engageable with the shaft such that an electrically conductive path extends between the shaft and the outer member through the inner conductor and the base plate.

In another aspect, the present invention is again an electrically conductive assembly for preventing current flow through the raceways of a bearing. The conductive assembly comprises a base plate formed of a conductive material, having a centerline coaxial with the central axis and including a circular central hub, the central hub having a cylindrical axial portion with an inner circumferential surface defining a circular bore and a radial portion extending radially inwardly from the axial portion. The base plate also has at least one integral mounting lug extending radially outwardly from the axial portion of the central hub, the at least one lug being connectable with the mounting surface of the outer member to secure the conductive assembly to the outer member at a position spaced axially from the bearing. Further, an inner annular conductor is disposed within the bore of the central hub and has an inner radial end engageable with the shaft. As such, an electrically conductive path extends between the shaft and the outer member through the inner conductor and the base plate.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are drawn to scale, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
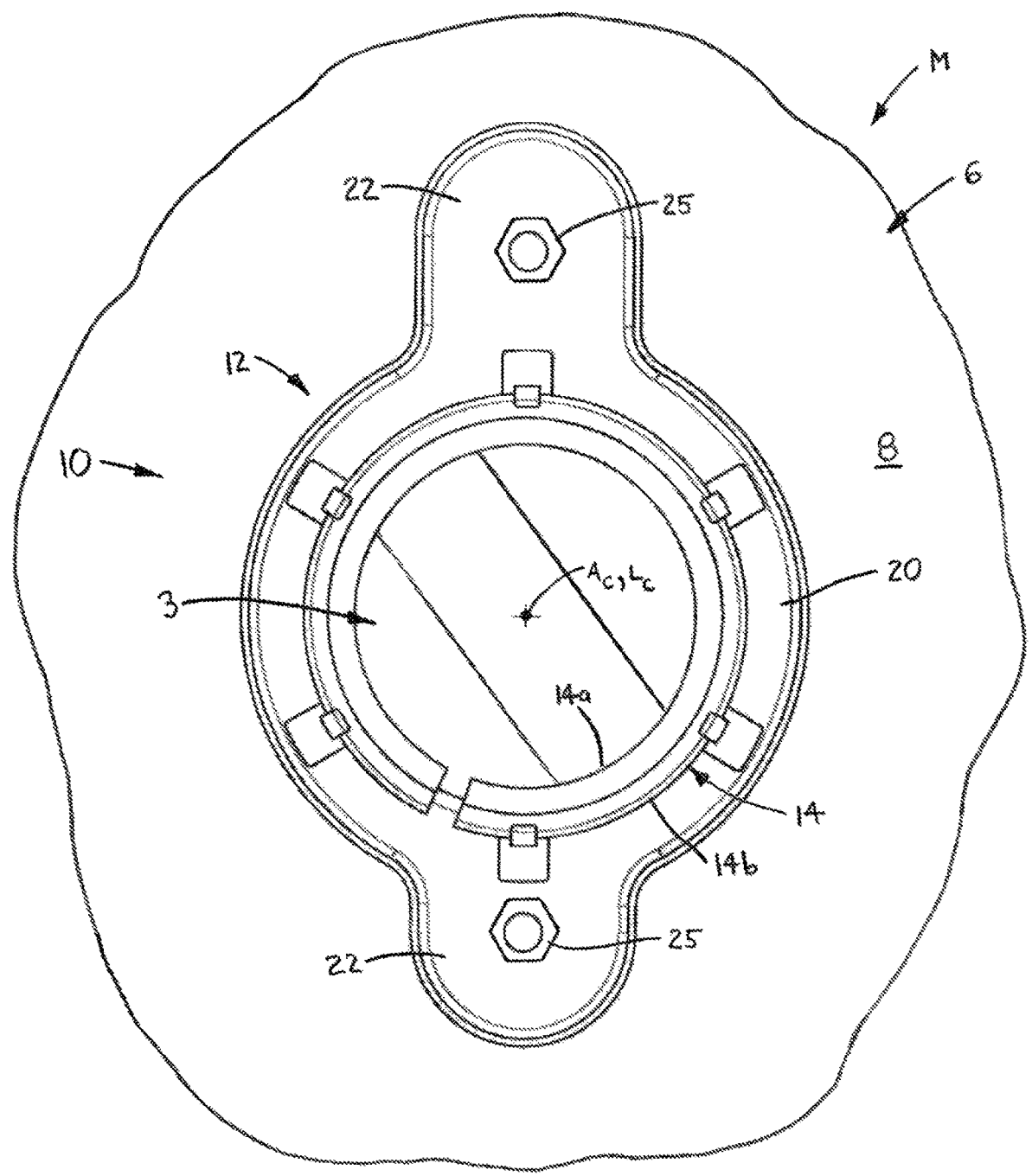
FIG. 1 is a broken-away, front plan view of a first embodiment of the conductor assembly in accordance with the present invention, showing a first construction of a base plate and depicted being disposed about a shaft and mounted to an outer member.
Figure 2:
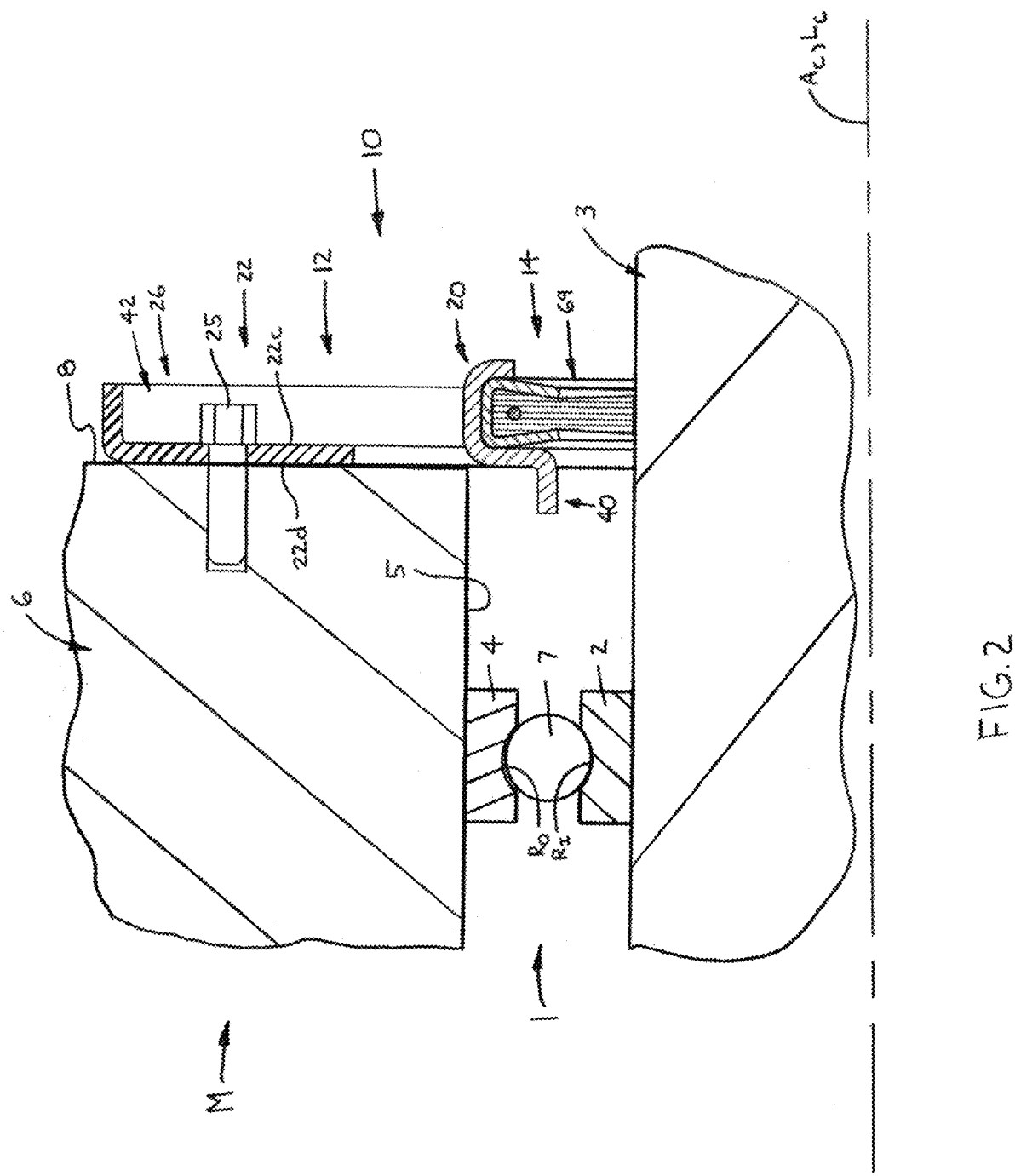
FIG. 2 is a broken-away, axial cross-sectional view of an upper portion of the conductor assembly of FIG. 1, shown disposed about shaft, mounted to an outer member and spaced from a bearing.
Figure 3:
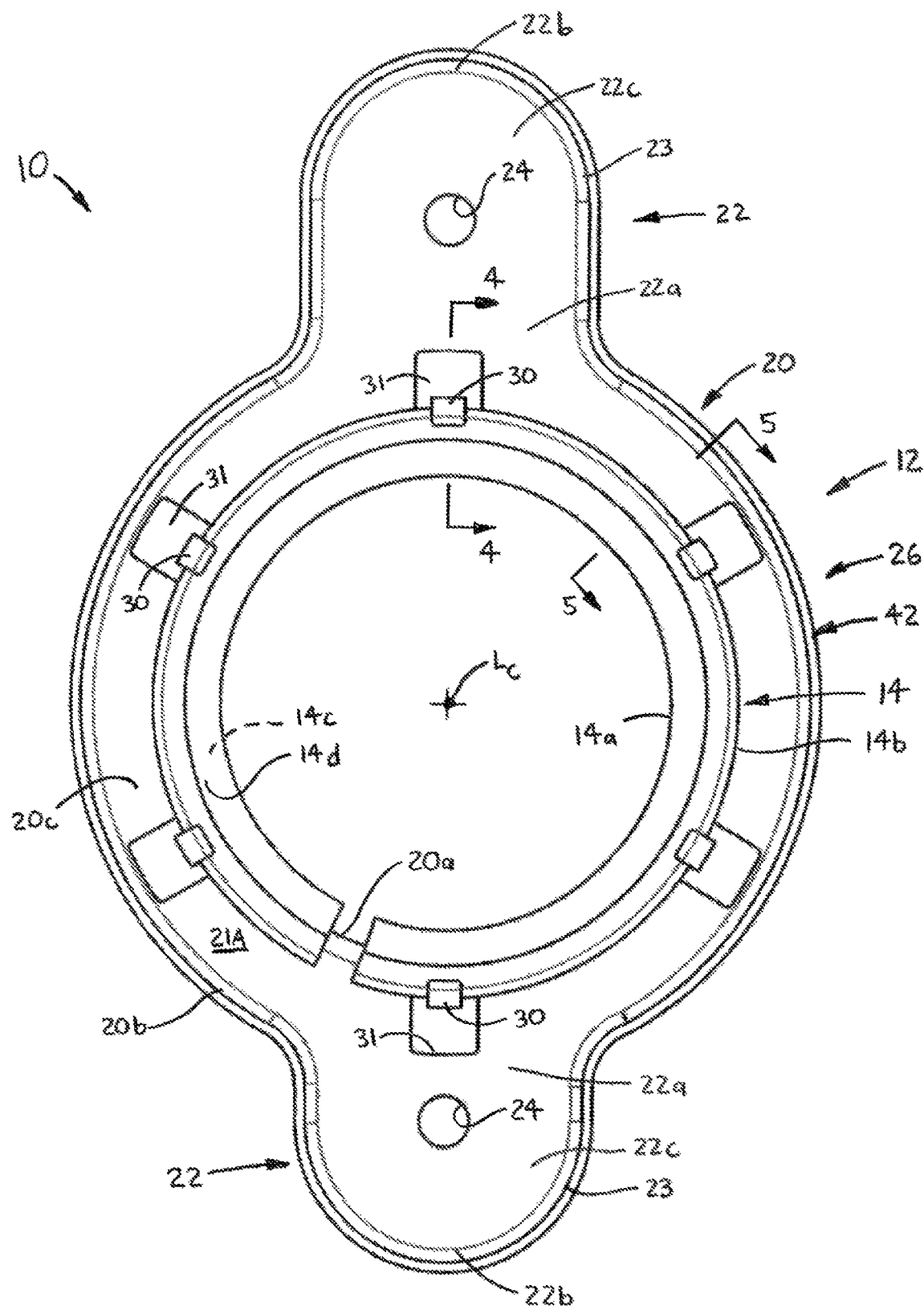
FIG. 3 is a front plan view of the conductor assembly of FIG. 1.
Figure 5:
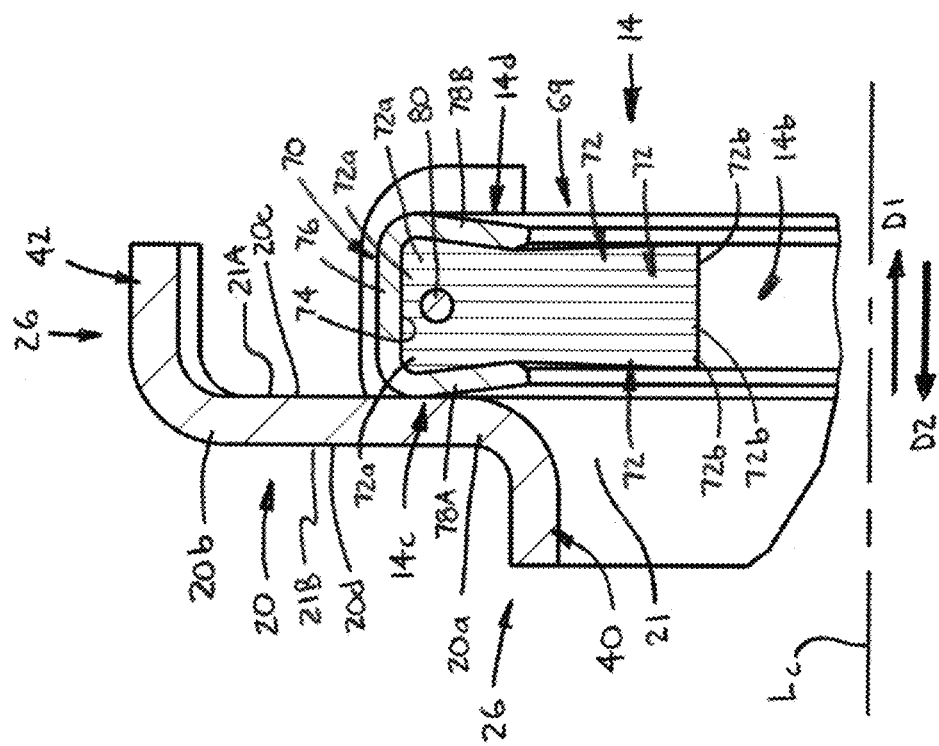
FIG. 5 is a view through line 5-5 of FIG. 3.
Figure 4:
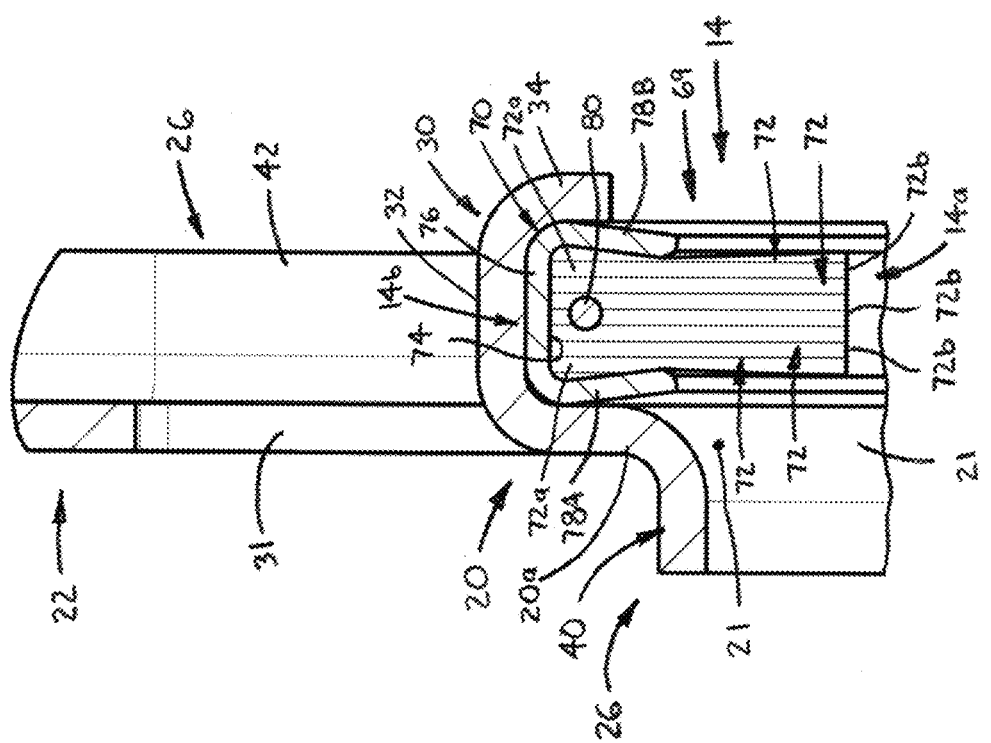
FIG. 4 is a view through line 4-4 of FIG. 3.
Figure 6:
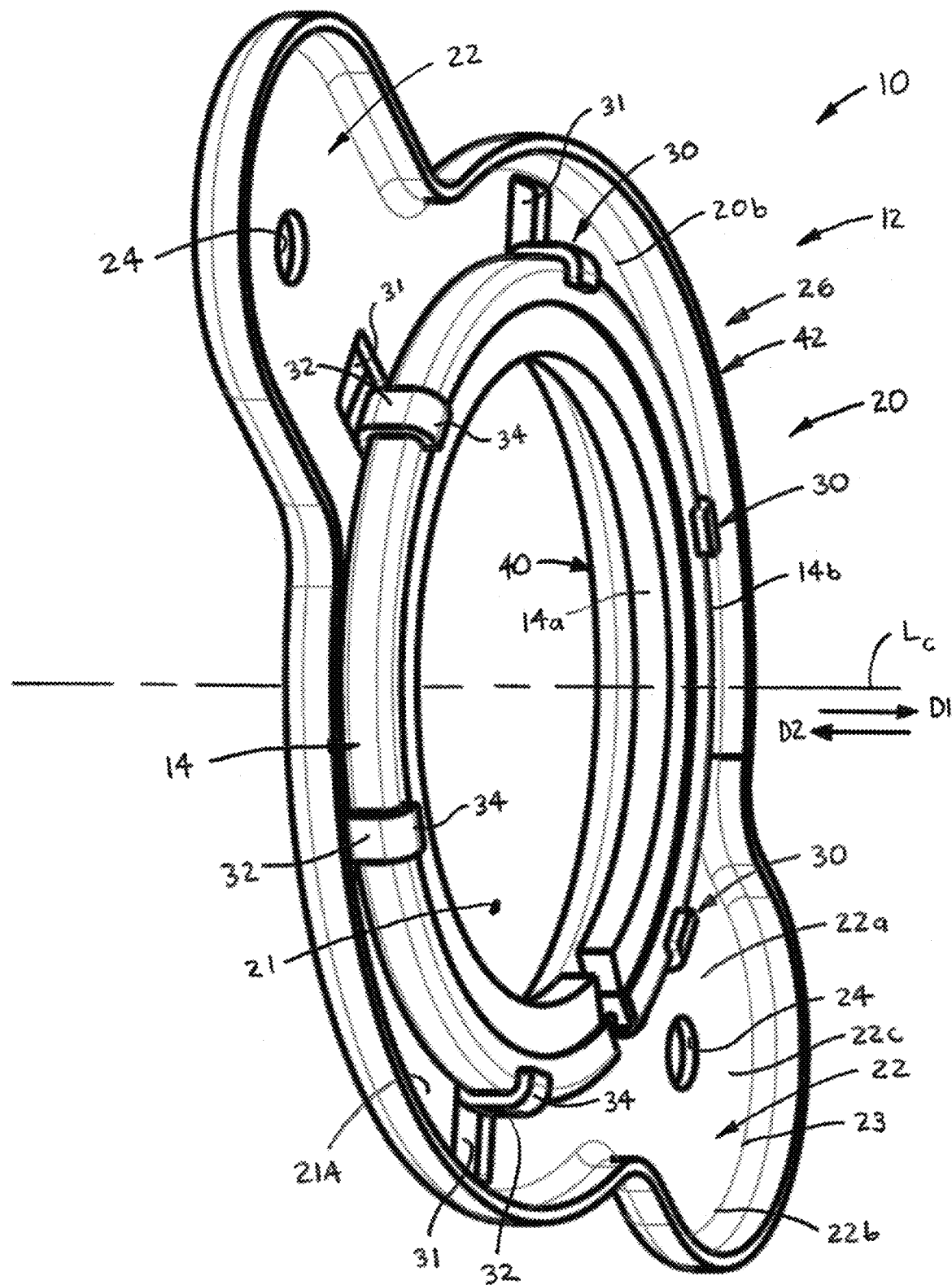
FIG. 6 is a front perspective view of the conductor assembly of FIG. 1.
Figure 7:
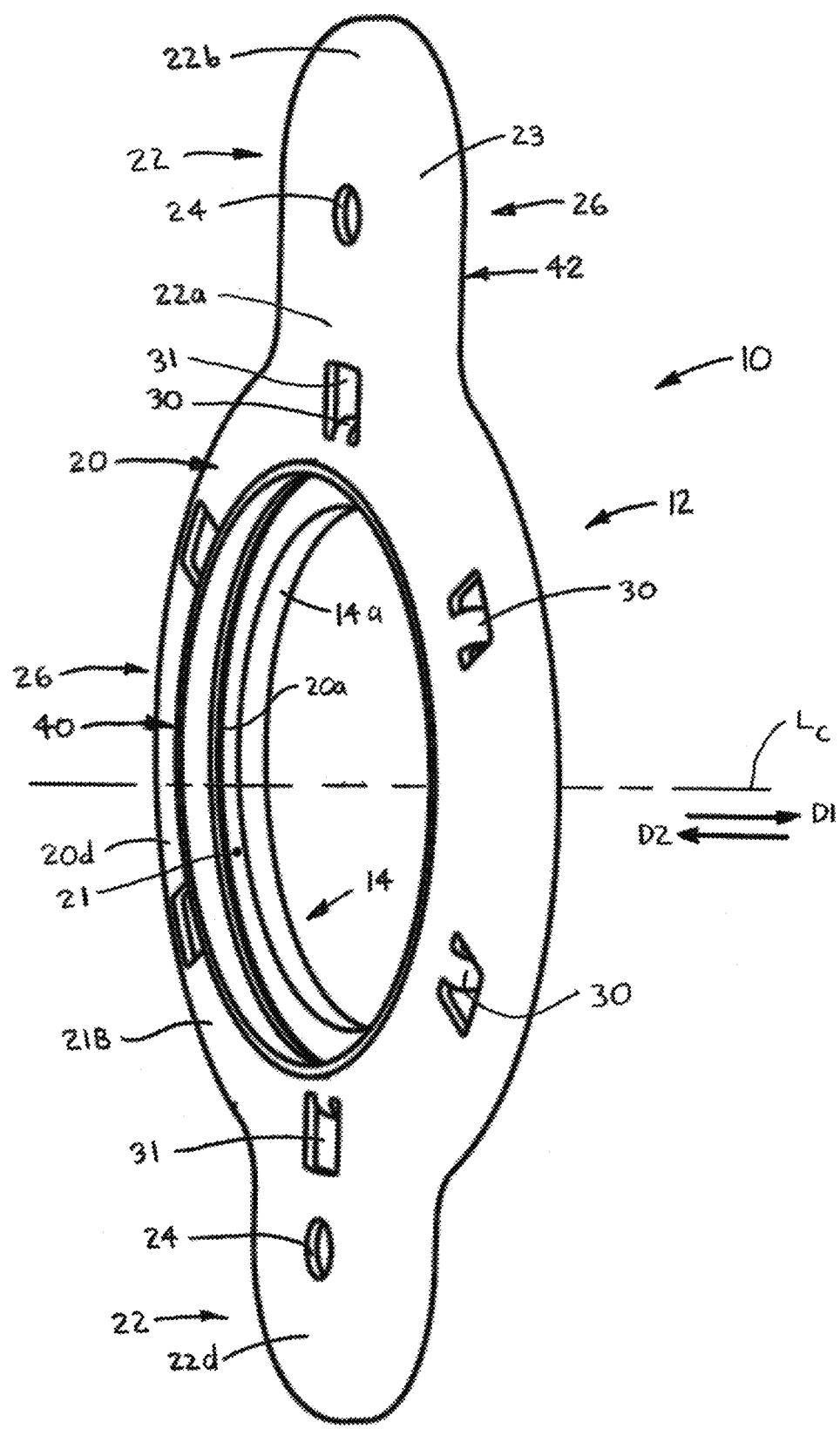
FIG. 7 is a rear perspective view of the conductor assembly of FIG. 1.

Referring now to the drawings in detail, wherein like numbers are used to indicate like elements throughout, there is shown in FIGS. 1-23 an electrically conductive assembly 10 for preventing current flow through the raceways $R_I$, $R_O$ of a bearing 1. As shown in FIG. 2, the bearing 1 has an inner ring 2 disposed about a shaft 3, an outer ring 4 disposed within a bore 5 of an outer member 6, and a plurality of rolling elements 7. The rolling elements 7 each roll simultaneously upon the raceways $R_I$, $R_O$ to rotatably couple the bearing rings 2, 4. Thereby, the bearing 1 rotatably couples the shaft 3 and the outer member 6 such that the shaft 3 or the outer member 6 is rotatable about a central axis $A_C$ through the shaft 3. Further, the outer member 6 may be a housing, an axle, a hub, etc. and has at least one exterior mounting surface 8, which is preferably radial, spaced radially outwardly from the bore 5. The bearing 1, the shaft 3 and the outer member 6 are all components of a motor or other electrical machine M (e.g., a generator) or any other machine having rotatable components likely to accumulate electric charge or convey electric current.

In any case, the conductive assembly 10 basically comprises a conductive base plate 12 connected with the outer member 6 and an inner annular conductor 14 connected with the base plate 12 and engageable with the shaft 3. As such, the conductive assembly 10 provides an electrically conductive path or paths extending between the shaft 3 and the outer member 6, through the inner conductor 14 and the base plate 12, so as to divert electric charge or current from flowing through the raceways $R_I$, $R_O$ and thereby prevents damage to both the raceways $R_I$, $R_O$ and the rolling elements 7.

More specifically, the base plate 12 has a centerline $L_C$, which is coaxial with the central axis $A_C$ when installed, and is formed of a conductive material, preferably a conductive metallic material, most preferably steel, but may be formed of another metallic material such as aluminum or copper, a conductive polymer, from graphite, etc. The base plate 12 includes a generally circular main body 20 entirely encircling the centerline $L_C$ and at least one and preferably two integral mounting lugs 22 extending radially outwardly from the main body 20. Each mounting lug 22 is connectable with the exterior, radial mounting surface 8 of the outer member 6 to secure the conductive assembly 10 to the outer member 6 at a position spaced axially from the bearing 1. Although two mounting lugs 22 are presently preferred and depicted, the base plate 12 may alternatively include only a single mounting lug 22 or three or more appropriately spaced mounting lugs 22.

In one preferred embodiment, the main body 20 is substantially flat and the base plate 12 further includes at least one and preferably a plurality of stiffening flanges 26 extending axially from and at least partially circumferentially about the inner perimeter of the main body 20 and/or the outer perimeter of the main body 20 and/or the outer perimeter of the mounting lugs 22, as shown in FIGS. 1-16. In another preferred embodiment, the main body 20 is formed as a circular hub 28 having a bore 29 for receiving the conductor 14 and each mounting lug 22 preferably includes at least one and preferably two elongated stiffening ribs 27 extending radially between the central hub 28 and an outer radial end 22b of the lug 22, as depicted in FIGS. 17-22.

Further, the inner conductor 14 has an outer radial end 14b connected with the base plate 12, an inner radial end 14a engageable with the outer surface 3a of the shaft 3 and opposing first and second axial ends 14c, 14d, respectively. Preferably, as described in detail below, the conductor 14 is formed as a conductive "brush assembly" 69 including a plurality of circumferentially spaced conductive fibers 72 extending inwardly from substantially the entire perimeter of the inner radial end 14a of the conductor 14. The conductive fibers 72 are preferably disposed within an annular retainer 70 formed of a conductive material and attached to the main body 20, as discussed below.

By having a base plate 12 and a connected conductor 14 that each encircles the centerline $L_C$, and thereby the shaft 3, the conductor 14 engages about almost the entire perimeter of the shaft 3. As such, the conductor 14 provides conductive paths for accumulated charge on the shaft 3 that are more effectively distributed about the entire shaft perimeter and essentially functions as a barrier against entry of foreign matter into the bore 5 of the outer member 6. Also, by connecting the base plate 12 is with the exterior surface 8 of the outer member 6, the conductive assembly 10 avoids thermal expansion issues of known conductive assemblies having an annular rim coupled with the inner surface of a bore, specifically potential separation of a retainer rim or excessive friction exerted by conductive fibers against the shaft as discussed in the Background of the Invention.

Further, by eliminating an amount of bore space required for installation of the conductive assembly 10, the axial length of the shaft 3 and the housing 6 may be reduced, thereby increasing the axial compactness of the particular machine M. Furthermore, by providing the base plate 12 with stiffening flanges 26 or by forming the main body 20 as a hub 28 and providing stiffening ribs 27 on the one or more mounting lugs 22, the base plate 12 of both embodiments has a substantially increased stiffness, which reduces potential vibration of the conductive assembly 10. Having described the basic components and functions above, these and other elements of the conductive assembly 10 of the present invention are described in greater detail below.

Referring now to FIGS. 1-16, as discussed above, the first embodiment of the conductive assembly 10 has a base plate 12 that is provided with stiffening flanges 26 in one of various arrangements, as described in detail below. In all constructions of the first embodiment, the plate main body 20 is substantially flat and generally circular and has an inner radial end 20a defining a central opening 21 sized to receive the shaft 3 with clearance and an opposing outer radial end 20b. The main body 20 further has a first axial end 20c with a flat, continuous radial surface 21A and an opposing, second axial end 20b with a flat, continuous radial surface 21B. As discussed below, the conductor 14 is disposed against the first radial surface 21A.

Further, each mounting lug 22 has an inner radial 22a integral with the outer radial end 20b of the main body 20, an outer radial end 22b spaced radially outwardly from the inner end 22a, an outer edge or perimeter 23, a first axial end 22c and a second axial end 22d. Each lug 22 is preferably generally rectangular with a curved outer end 22b, but may have any other appropriate shape. Furthermore, each one of the mounting lugs 22 preferably includes a fastener opening 24 for receiving a separate one of the two fasteners 25, as shown in FIGS. 1 and 2. Specifically, each fastener 25 is engageable with the outer member 6 to connect the base plate 12 with the outer member 6, preferably threadably engaged with a threaded opening (not indicated) extending inwardly from the exterior, radial mounting surface 8. However, the mounting lugs 22 may include two or more fastener openings 24 or be attached to the exterior surface 8 by any other appropriate means, such as for example, by separate clamping members attached to the outer member 6, by frictionally engaging an axial portion of the mounting lugs 22 with a circumferential or axially transverse mounting surface 8, etc. (no alternatives shown).

Still referring to FIGS. 1-16, the main body 20 preferably has a plurality of integral mounting tabs 30 each extending axially from the main body 20 and spaced circumferentially about the centerline $L_C$. Each mounting tab 30 is engaged with the inner conductor 14 to connect the conductor 14 with the base plate 12. More specifically, each mounting tab 30 has an axial portion 32 extending from the outer radial end 20a of the annular plate 20 and a radial portion 34 spaced axially from the annular plate 20 and extending inwardly from the axial portion 32. As such, the conductor 14 is axially sandwiched between the plate main body 20 and the radial portion 34 of each tab 30.

With the preferred base plate 12 being formed by stamping a flat blank, each mounting tab 30 is formed by cutting a generally C-shaped opening 31 in the blank (not shown), such that the tab 30 is formed generally as a flat finger (not shown) located within the opening 31, which is integral with and extends radially outwardly from a remainder of the main body 20. The finger is then bent twice to encircle the outer radial end 14b of the conductor 14, while the opening 31 provides a clearance for lubricant flow to and from the bearing 1. However, the base plate 12 or the conductive assembly 10 may alternatively be formed to attach the inner conductor 14 to the base plate 12 by any other appropriate means, such as for example, by separate clip members which attach the conductor 14 to the plate main body 20, by fasteners that extend through the conductor 14 and the base plate 12, etc.

Referring to FIGS. 3 and 6-16, in all presently preferred constructions of the first embodiment, the at least one stiffening flange 26 includes both at least one inner stiffening flange 40 and at least one outer stiffening flange 42. The at least one inner stiffening flange 40 extends axially from the inner end 20a of the plate main body 20, and in all presently preferred constructions, is formed as a single flange 40 that is continuous and extends entirely about the centerline $L_C$ of the base plate 12. In certain applications, the inner stiffening flange 40 may be configured, i.e., sized axially and diametrically as well as being located relative to the centerline $L_C$, such that the flange 40 may be inserted into an open end of the bore 6 so as to at least generally center the conductive assembly 10 about the shaft 3 (structure not depicted).

Further, the at least one outer stiffening flange 42 extends axially from the main body outer radial end 20b and/or from the outer perimeter 23 of at least one of the two mounting lugs 22. Preferably, each outer stiffening flange 42 extends in a first axial direction D1 from the first axial end 20c of the main body 20 and/or the first axial end 22c of the lug 22, while the inner stiffening flange(s) 40 extends in a second, opposing axial direction D2 from the second axial end 20d of the plate main body 20.

Referring now to FIGS. 3 and 6-10, in both a first construction and a second construction of the first embodiment base plate 12, the two mounting lugs 22 are spaced circumferentially apart about the centerline $L_C$ by about one hundred eighty degrees (180°). In the first construction of FIGS. 3-7, the outer stiffening flange 42 is formed as a single, continuous outer stiffening flange 44 extending about the entire perimeter 23 of each one of the two lugs 22 and about the two sections (not indicated) of the outer radial end 22b of the main body 22 extending between the two mounting lugs 22. In the first construction, the main body 20 is sized with a substantial radial extent, i.e., between the inner and outer radial ends 20a, 20b, such that each one of the clearance openings 31 is generally square or rectangular and located radially between the inner and outer radial ends 20a, 20b so as to be entirely enclosed.

Figure 8:
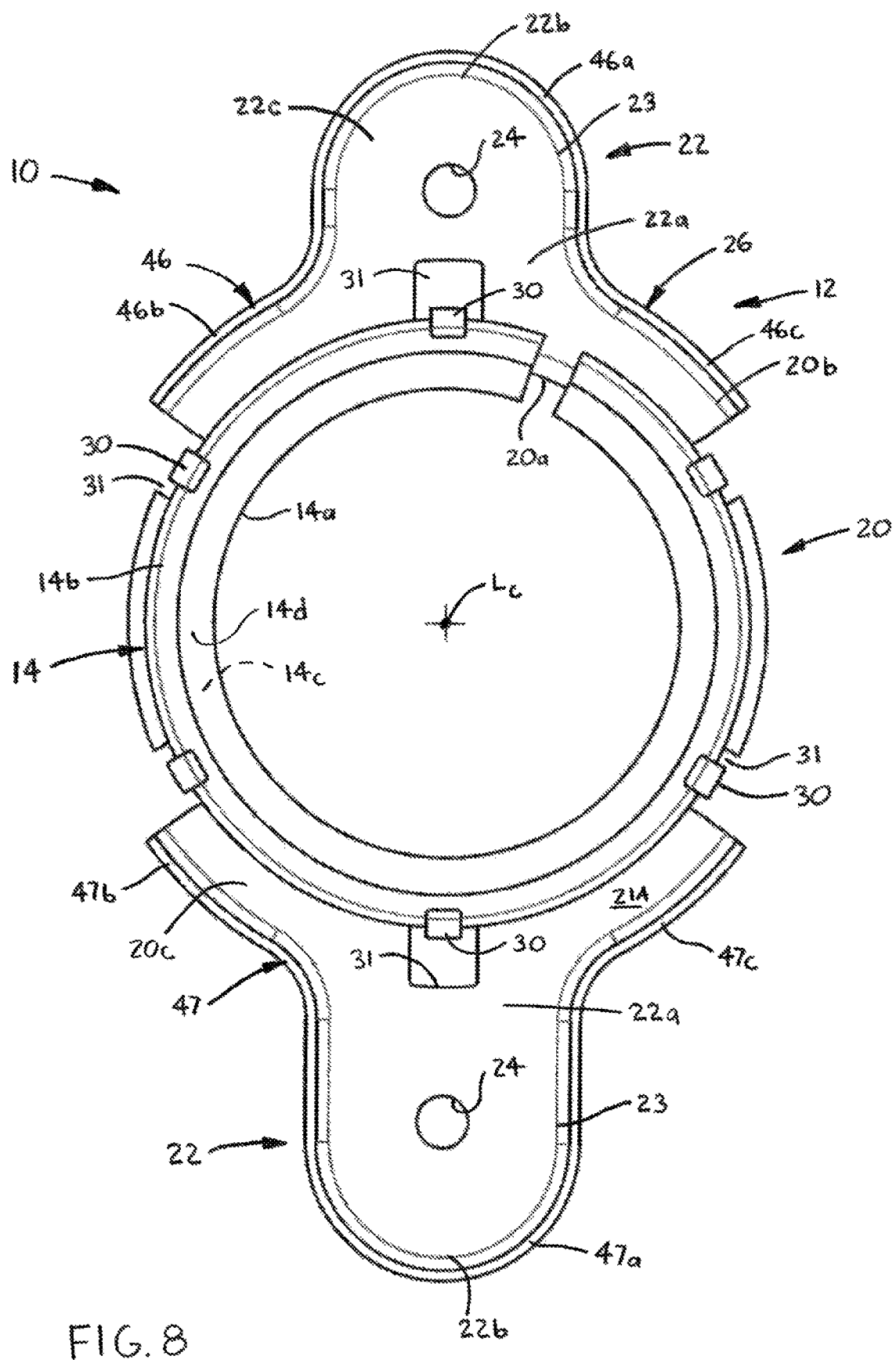
FIG. 8 is a front plan view of the first embodiment conductor assembly shown with a second construction of the base plate.
Figure 9:
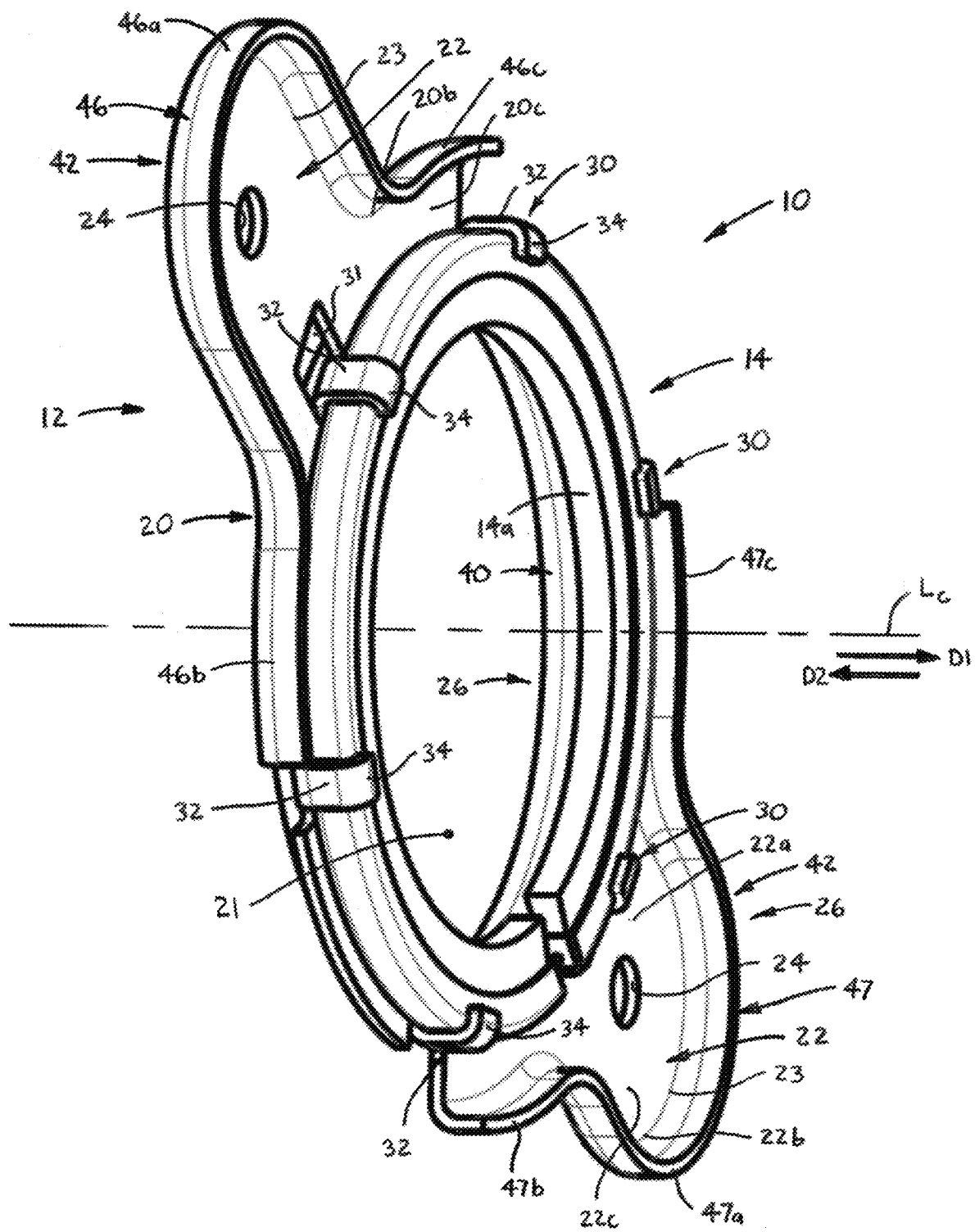
FIG. 9 is a front perspective view of the conductor assembly of FIG. 8.
Figure 10:
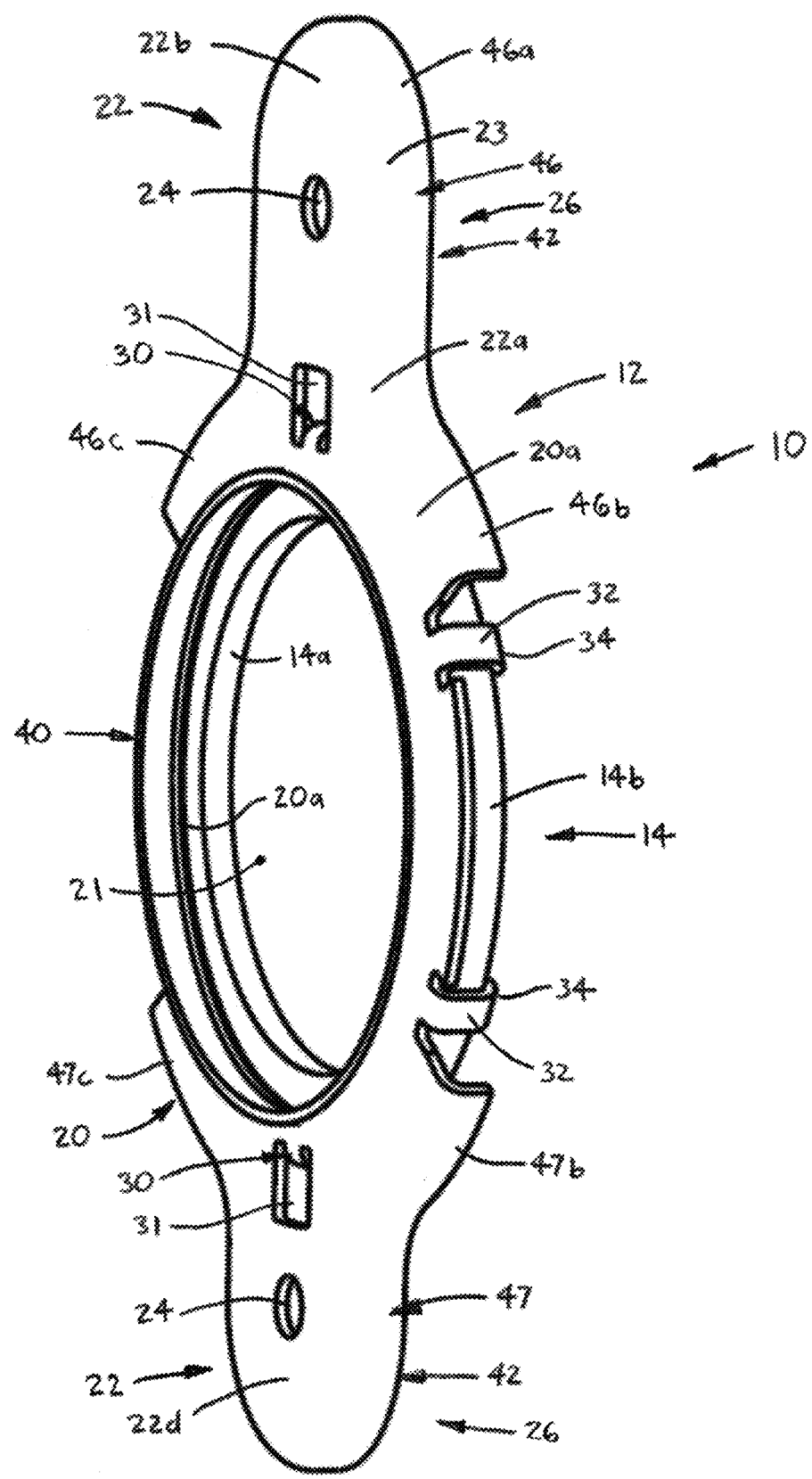
FIG. 10 is a rear perspective view of the conductor assembly of FIG. 8.
Figure 11:
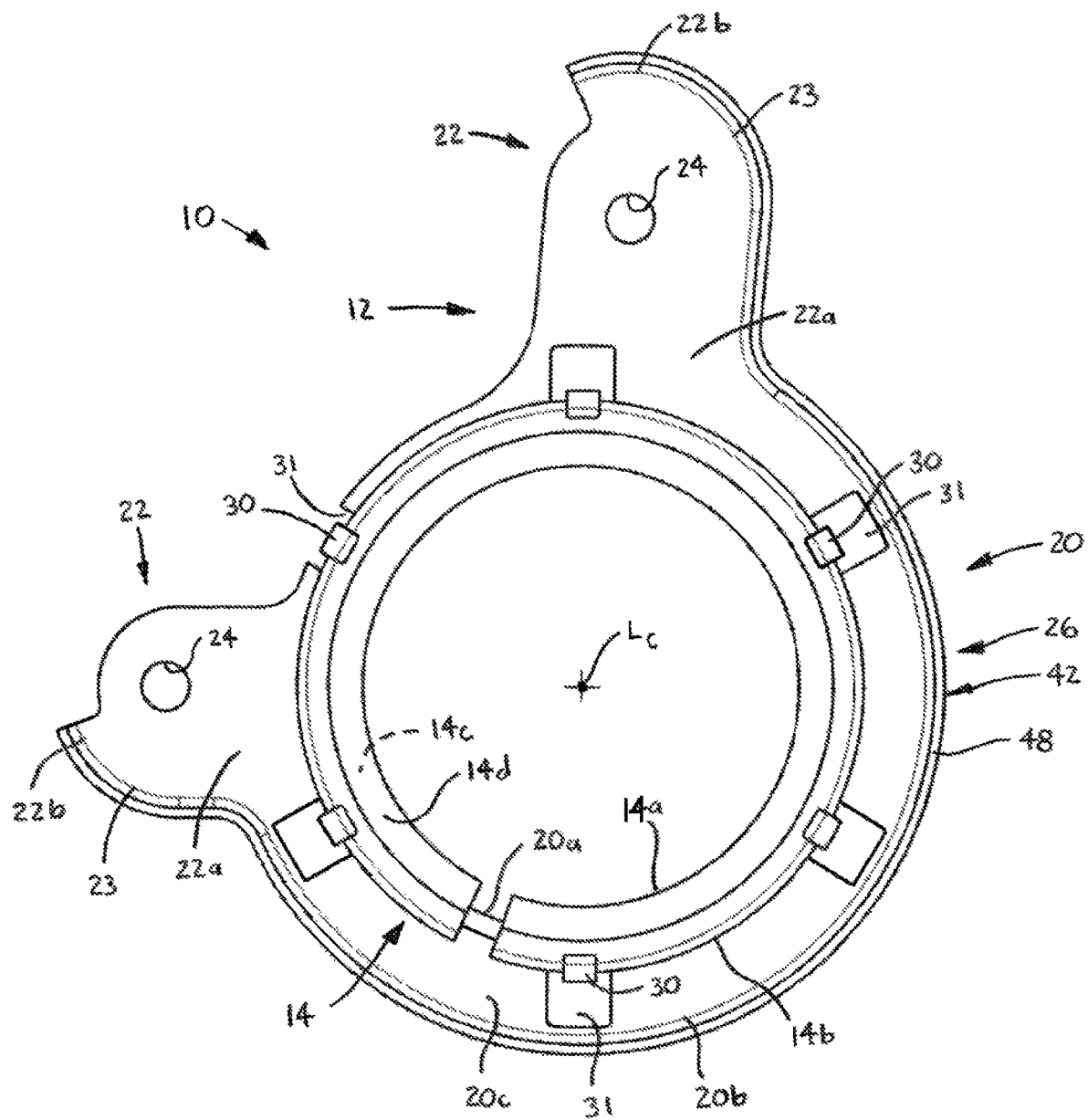
FIG. 11 is a front plan view of the first embodiment conductor assembly shown with a third construction of the base plate.
Figure 12:
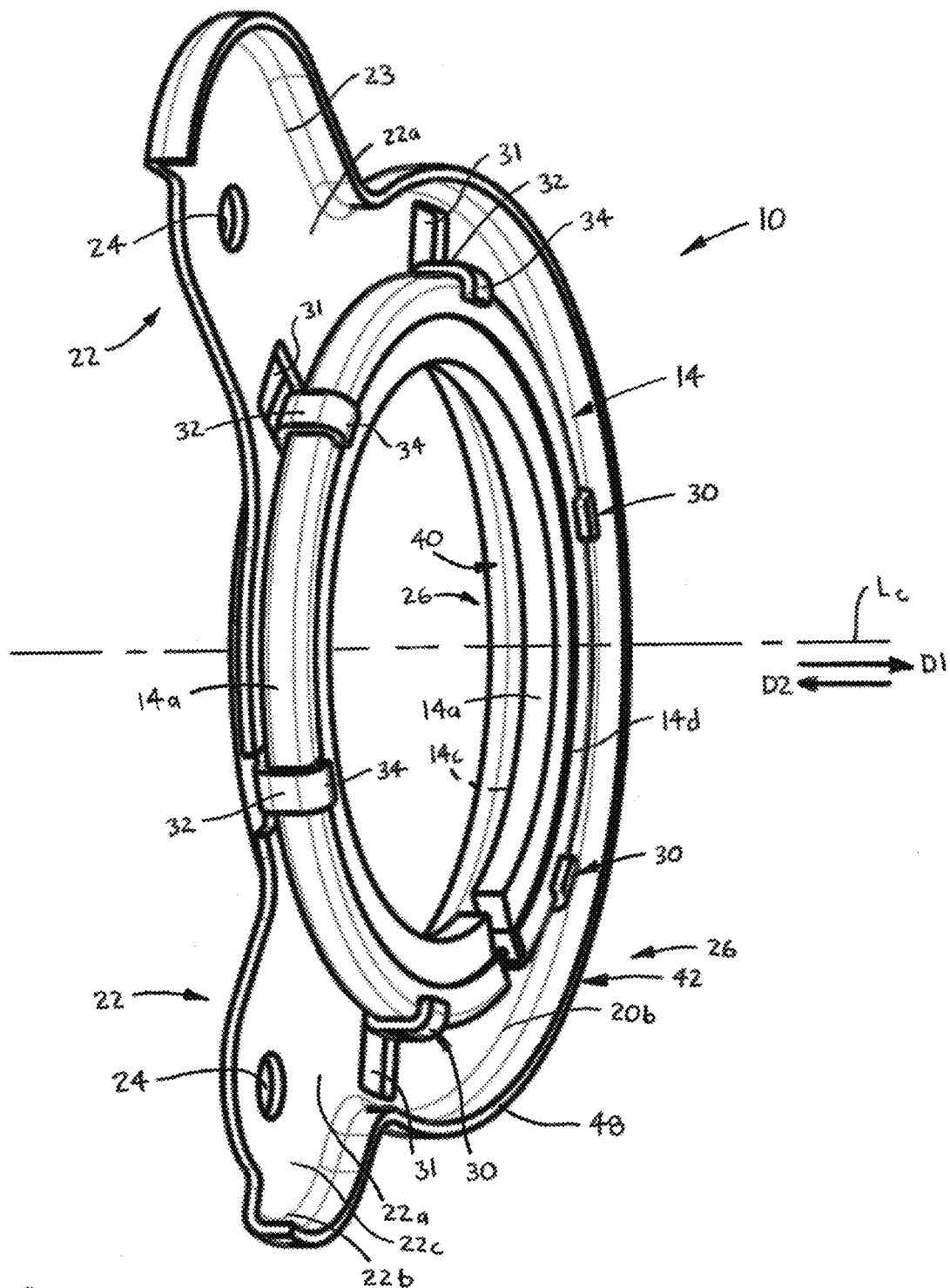
FIG. 12 is a front perspective view of the conductor assembly of FIG. 11.
Figure 13:
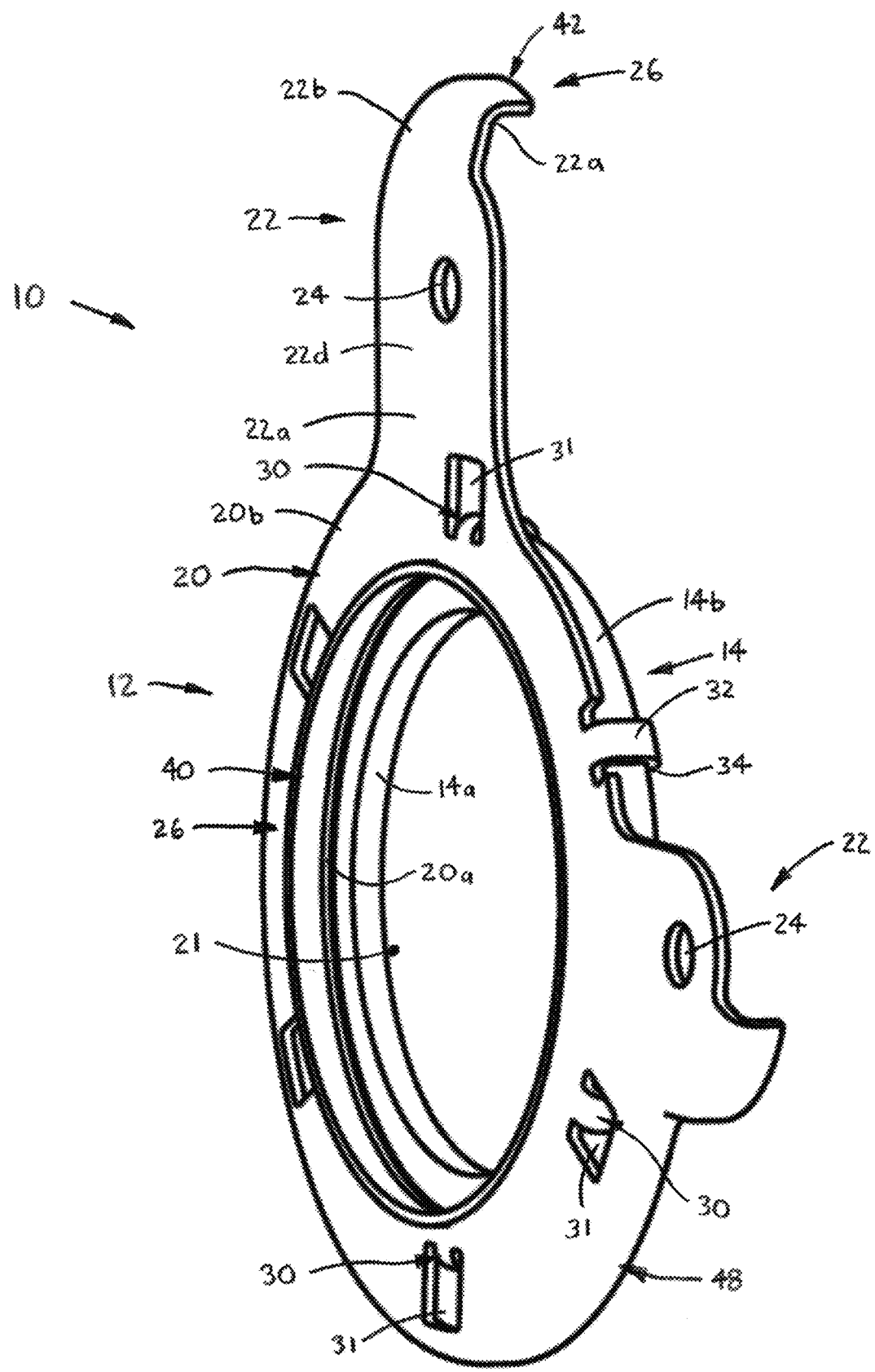
FIG. 13 is a rear perspective view of the conductor assembly of FIG. 11.

In the second construction shown in FIGS. 8-10, the at least one outer stiffening flange 42 includes first and second outer stiffening flanges 46, 47 spaced apart about the centerline $L_C$. Specifically, the first outer flange 46 extends about an entire perimeter 23 of one of the two mounting lugs 22 and partially about the outer end 20b of the main body 20. The second outer stiffening flange 47 extends about an entire perimeter 23 of the other one of the two mounting lugs 22 and partially about the outer end 20b of the main body 20. More specifically, each outer flange 46, 47 has a central portion 46a, 47a, respectively, extending entirely about the one lug 22 and two outer sections 46b, 46c and 47a, 47c each extending from the central section 46a, 47a and about a separate section of the main body outer radial end 20b.

Further, the second construction base plate 12 has two enclosed clearance openings 31 located between the centerline $L_C$ and a separate mounting lug 22 that are each square/rectangular, while the remaining clearance openings 31 are "open-ended". Preferably, the second construction is formed from a base plate 12 of the first construction by cutting two arcuate sections from the main body 20 located between the two mounting lugs 22. However, the second construction may be formed in any other appropriate manner. In any case, the second construction may be utilized in an application in which the space on either transverse side of the two mounting lugs 22 is limited.

Referring now to FIGS. 11-16, in both a third construction and a fourth construction of the first embodiment conductive assembly 10, the two mounting lugs 22 are spaced circumferentially apart about the centerline $L_C$ by about ninety degrees (90°), preferably slightly more than ninety degrees (e.g., 95°). Both of these constructions are formed for applications in which the mounting surface(s) 8 is/are not continuous about the central axis $A_C$ and two sections of the surface 8 spaced by one hundred eighty degrees are not available In the third construction of FIGS. 11-13, the outer stiffening flange 42 is formed as a single, continuous outer stiffening flange 48 that extends about a substantial section of the perimeter 23 of each one of the two lugs 22 and about a circumferentially-larger section of the outer radial end 22b of the main body 22 extending between the two mounting lugs 22. In the third construction, a major portion of the main body 20 is sized with a substantial radial extent, i.e., between the inner and outer radial ends 20a, 20b, such that most of the clearance openings 31 are generally square/rectangular and located radially between the inner and outer radial ends 20a, 20b so as to be enclosed, with only a single opening 31 being open-ended. The third construction provides clearance in a quadrant of the base plate 20 between the two mounting lugs 22.

Figure 14:
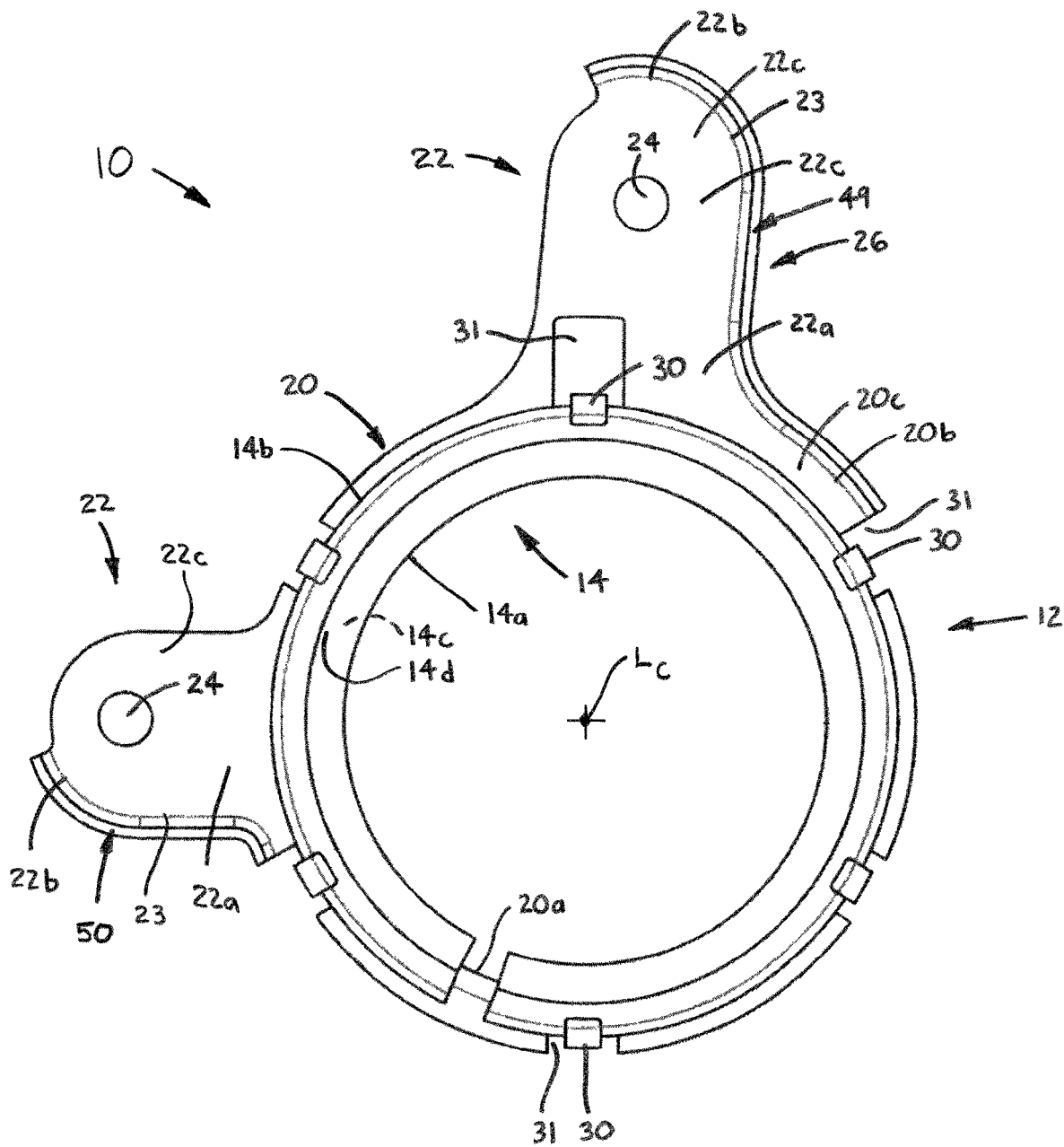
FIG. 14 is a front plan view of the first embodiment conductor assembly shown with a fourth construction of the base plate.
Figure 15:
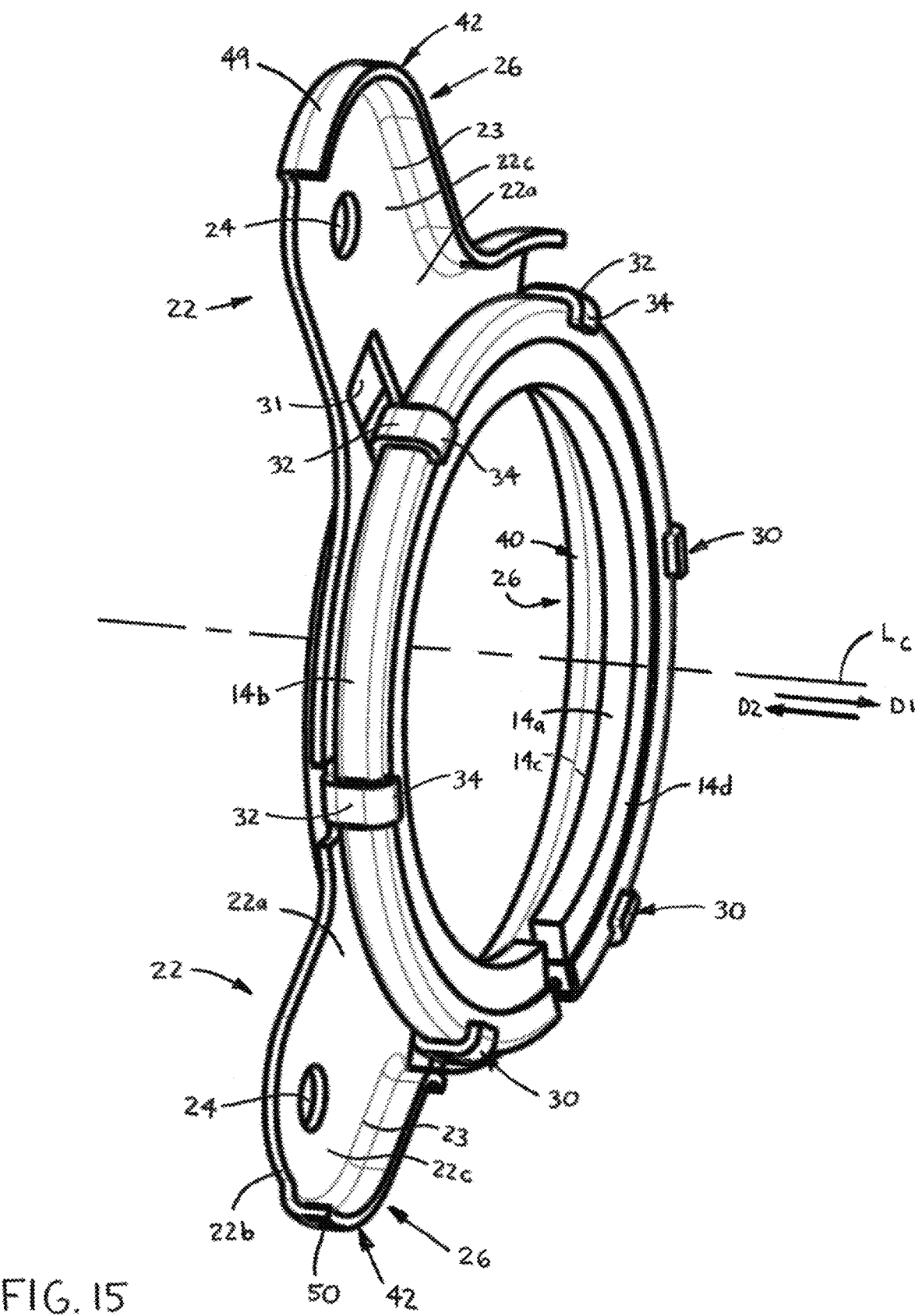
FIG. 15 is a front perspective view of the conductor assembly of FIG. 14.
Figure 16:
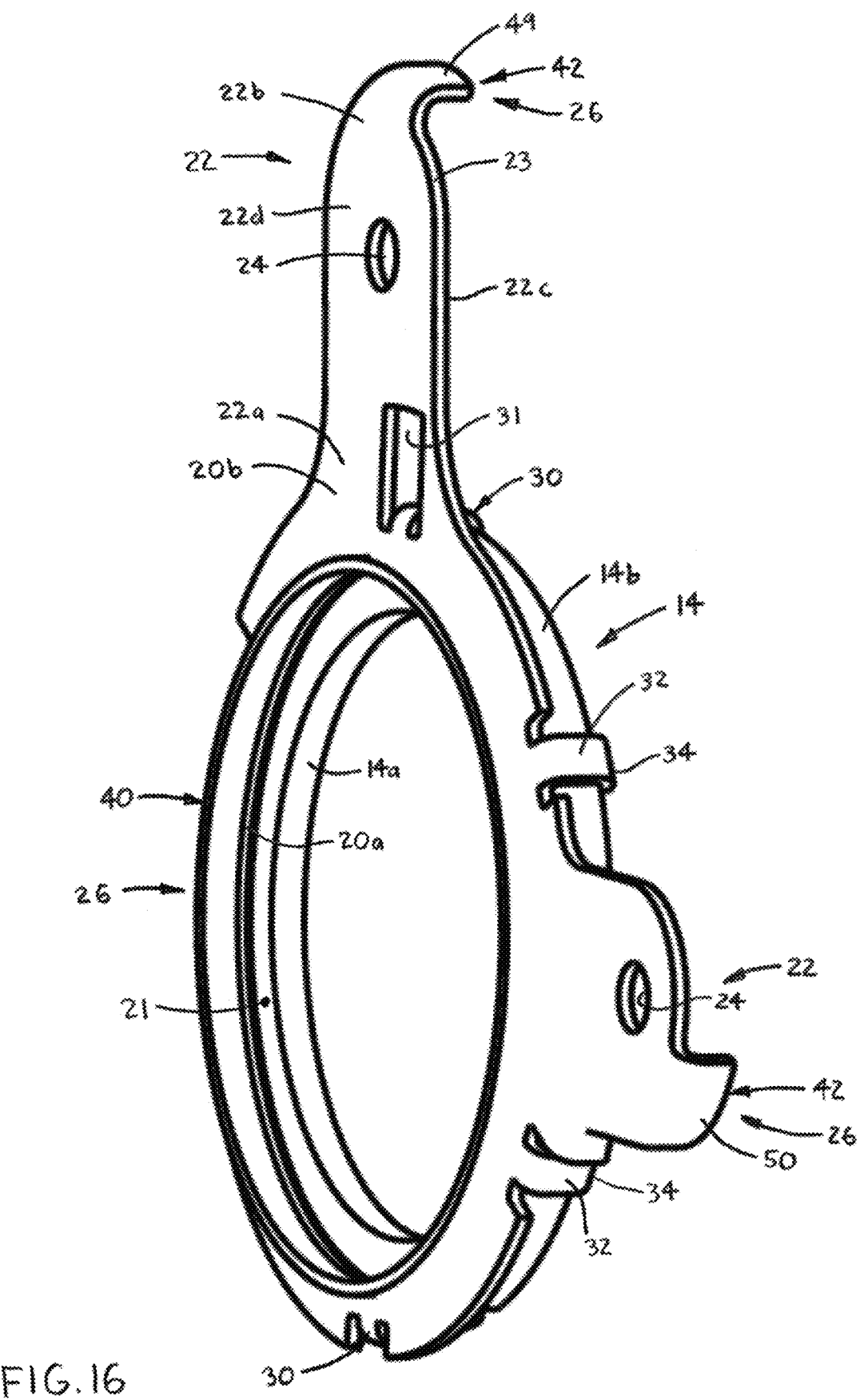
FIG. 16 is a rear perspective view of the conductor assembly of FIG. 14.

In the fourth construction shown in FIGS. 14-16, the at least one stiffening flange 42 includes a first outer stiffening flange 49 extending about a portion of the perimeter of one of the two mounting lugs 22 and partially about the outer end 20b of the main body 20 and a second outer stiffening flange 50 extending a portion of the other one of the two mounting lugs 22 and partially about the outer end 20b of the main body 20. In the fourth construction, one clearance opening 31 is enclosed while the remaining openings 31 are open-ended. The fourth construction is utilized in applications in which space is limited about a substantial portion of the perimeter of the main body 20.

Although four exemplary base plate constructions of the first embodiment conductive assembly 10 are shown and depicted, which vary by the circumferential length and continuity of the outer flange(s) 42, the one or more inner and outer stiffening flanges 40, 42 may be formed in any other appropriate manner. For example, the at least one inner flange 40 may be formed as two or more circumferentially extending inner flanges 40 and of any appropriate circumferential and axial length (not shown). Similarly, one or more of the current outer flanges 42 may alternatively be formed as two or more separate flange sections separated by circumferential gaps (not shown). The scope of the present invention includes these and any other appropriate configuration(s) or construction(s) of the plate main body 20, the mounting lugs 22 and the stiffening flanges 26.

Figure 22:
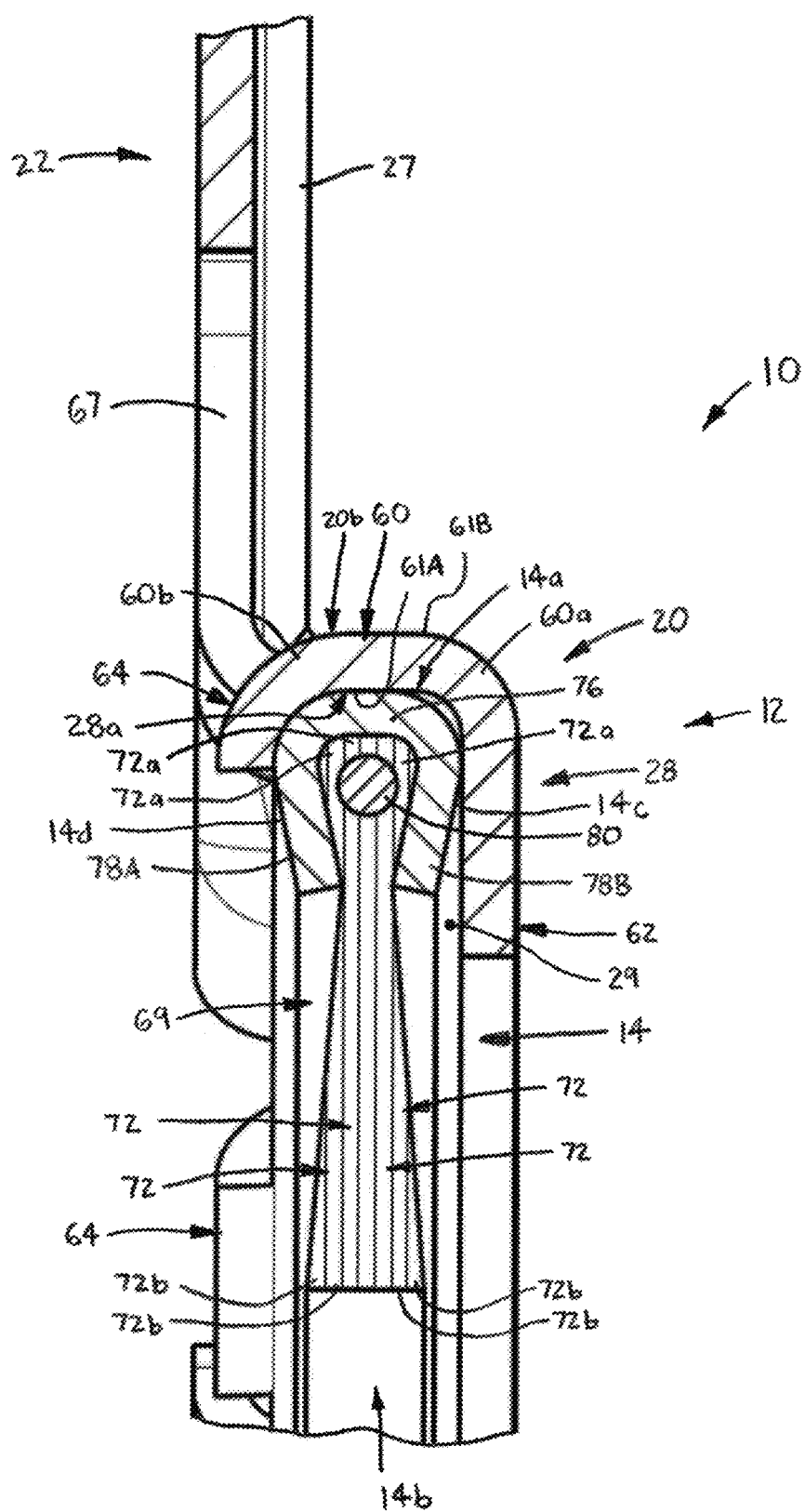
FIG. 22 is an enlarged view of a portion of FIG. 20.
Figure 23:
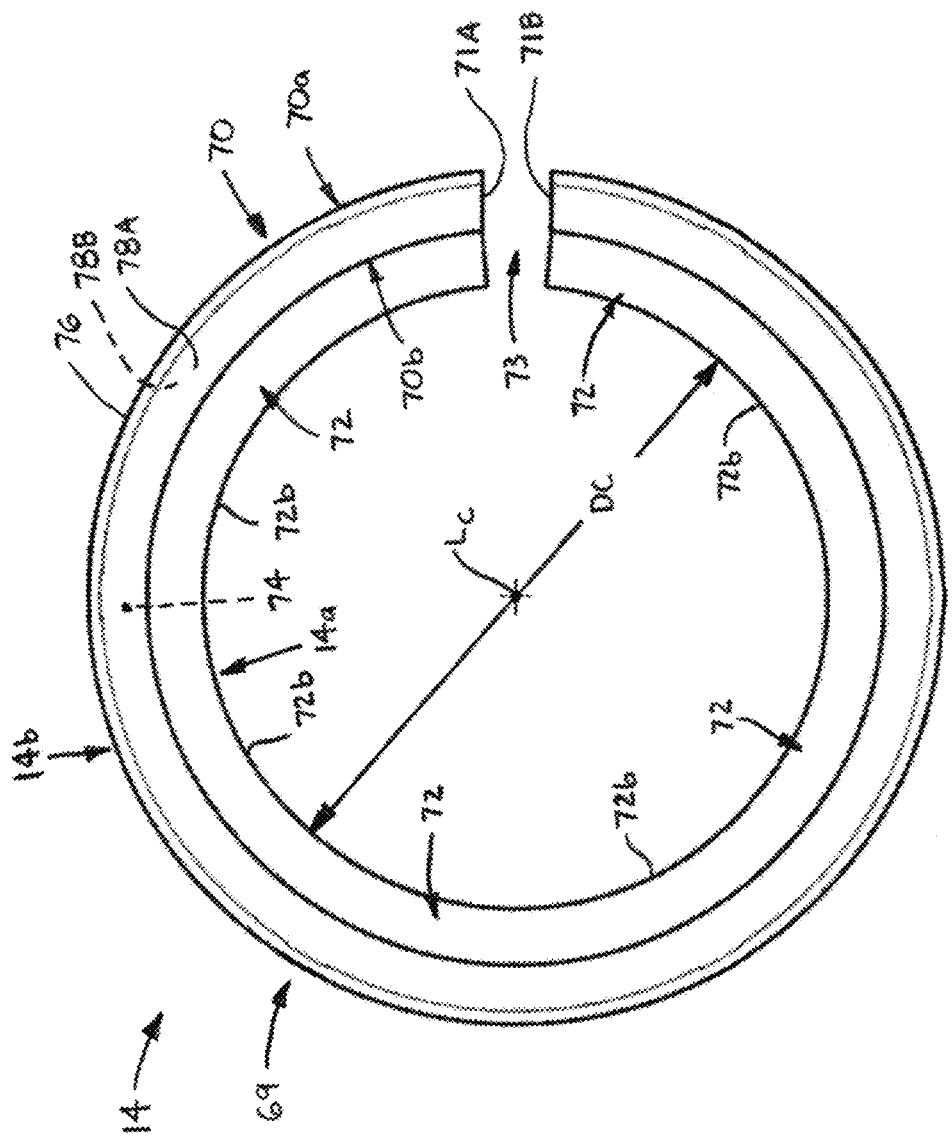
FIG. 23 is a side plan view of a preferred conductor.

Referring to FIGS. 17-22, in the second embodiment of the conductor assembly 10, the main body 22 of the base plate 12 is formed as circular central hub 28 with inner and outer radial ends 28a, 28b, the two mounting flanges 22 each extending from the outer radial end 28b of the central hub 28. The circular hub 28 includes a cylindrical axial portion 60 and a radial portion 62 extending radially inwardly from the axial portion 60. Specifically, the axial portion 60 has first and second axial ends 60a, 60b, an inner circumferential surface 61A defining the circular bore 29, and an opposing outer circumferential surface 61B, as best shown in FIG. 22. The radial portion 62 extends inwardly from the first axial end 60a of the axial portion 60 and the two mounting lugs 22 each extend radially outwardly from the second axial end 60b of the axial portion 60. As mentioned above, the inner conductor 14 is disposed within the bore 29 (indicated in FIG. 22) of the central hub 28 with the first axial end 14c being disposed against the hub radial portion 62.

Preferably, the central hub 28 further includes a plurality of integral retainer tabs 64 spaced circumferentially about the centerline $L_C$ and extending radially inwardly from the second axial end 60b of the hub axial portion 60 and disposed against the second axial end 14d of the conductor 14. Further, the central hub 28 preferably further includes a plurality stiffening flanges 66 extending radially outwardly from the second axial end 60b of the hub axial portion 60 and spaced circumferentially about the centerline $L_C$. Each stiffening flange 66 is disposed circumferentially between a separate pair of the retainer tabs 66.

Further, the two mounting lugs 22 are spaced circumferentially apart about the centerline $L_C$ by about one hundred eighty degrees (180°) and each mounting lug 22 has an inner radial 22a integral with the outer radial end 20b of the main body 20 and an outer radial end 22b spaced radially outwardly from the inner end 22a. Each lug 22 is preferably generally rectangular with a curved outer end 22b, but may have any other appropriate shape. Furthermore, each one of the mounting lugs 22 preferably includes a fastener opening 24 for receiving a fastener (none shown) engageable with the outer member 6, so as to connect the base plate 12 with the outer member 6. Alternatively, each mounting lug 22 may include two or more fastener openings 24 or be attached to the exterior surface 8 by any other appropriate means (no alternatives shown).

Figure 17:
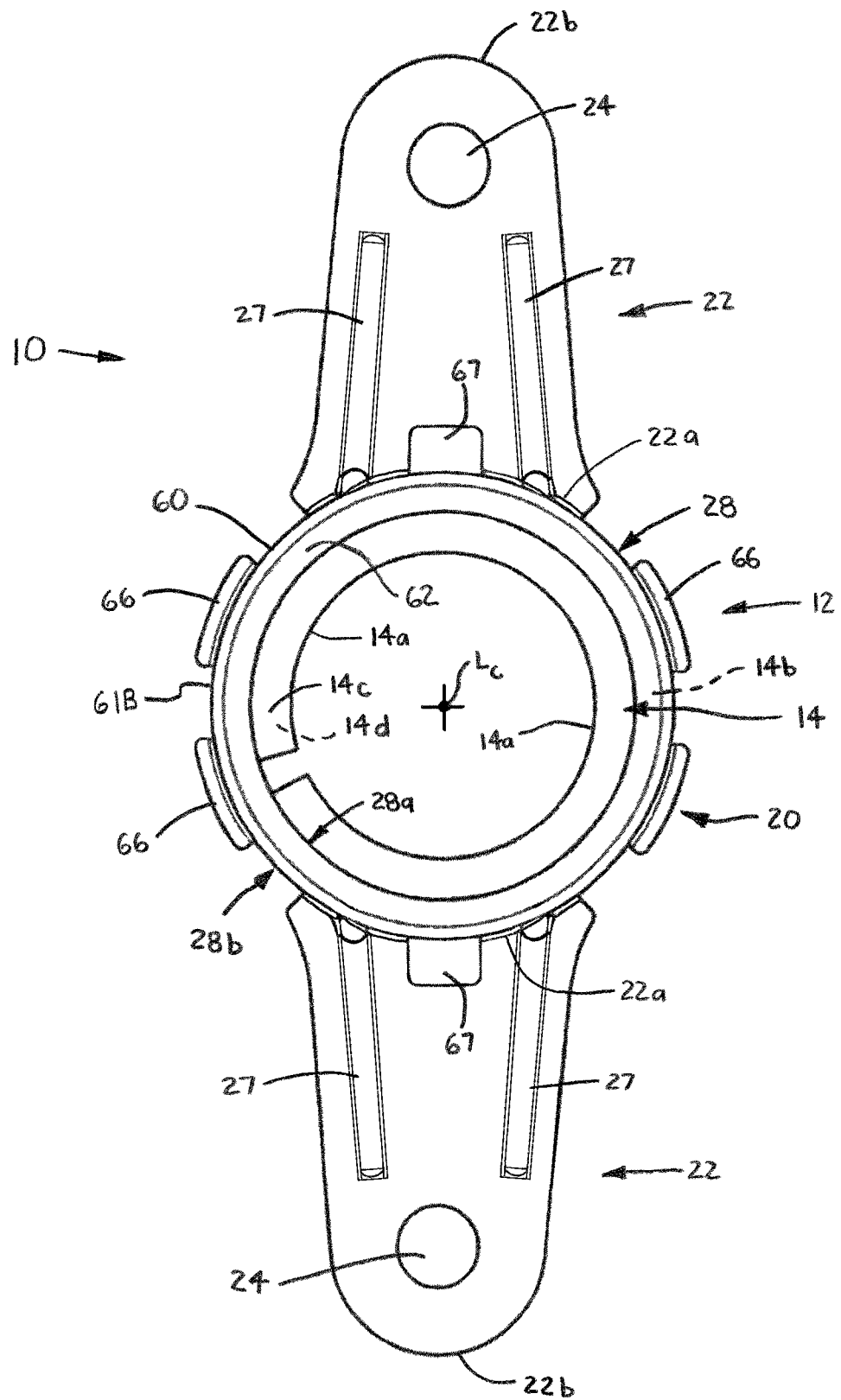
FIG. 17 is a front plan view of a second embodiment of the conductor assembly.
Figure 18:
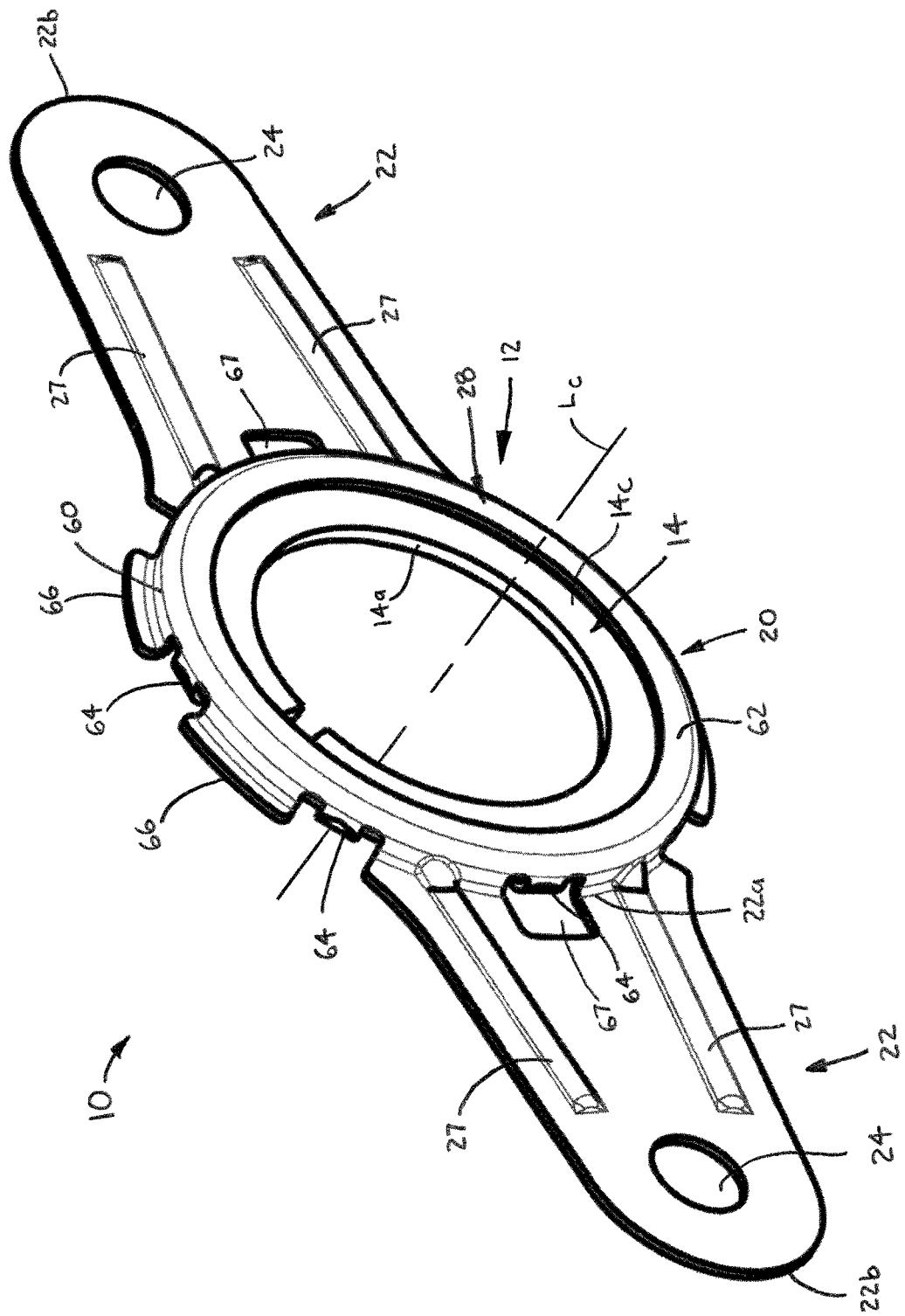
FIG. 18 is a front perspective view of the conductor assembly of FIG. 17.
Figure 19:
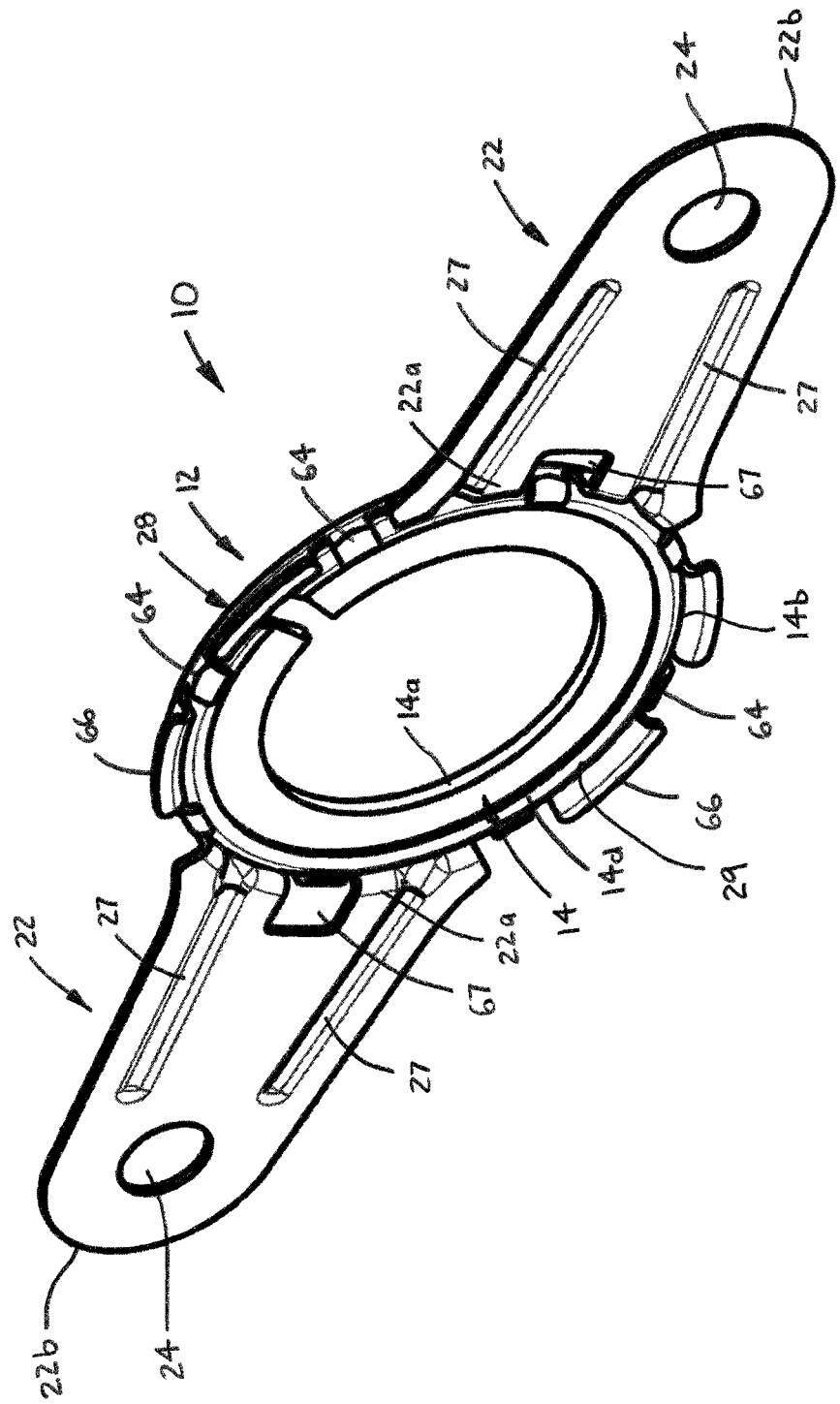
FIG. 19 is a rear perspective view of the conductor assembly of FIG. 17.
Figure 20:
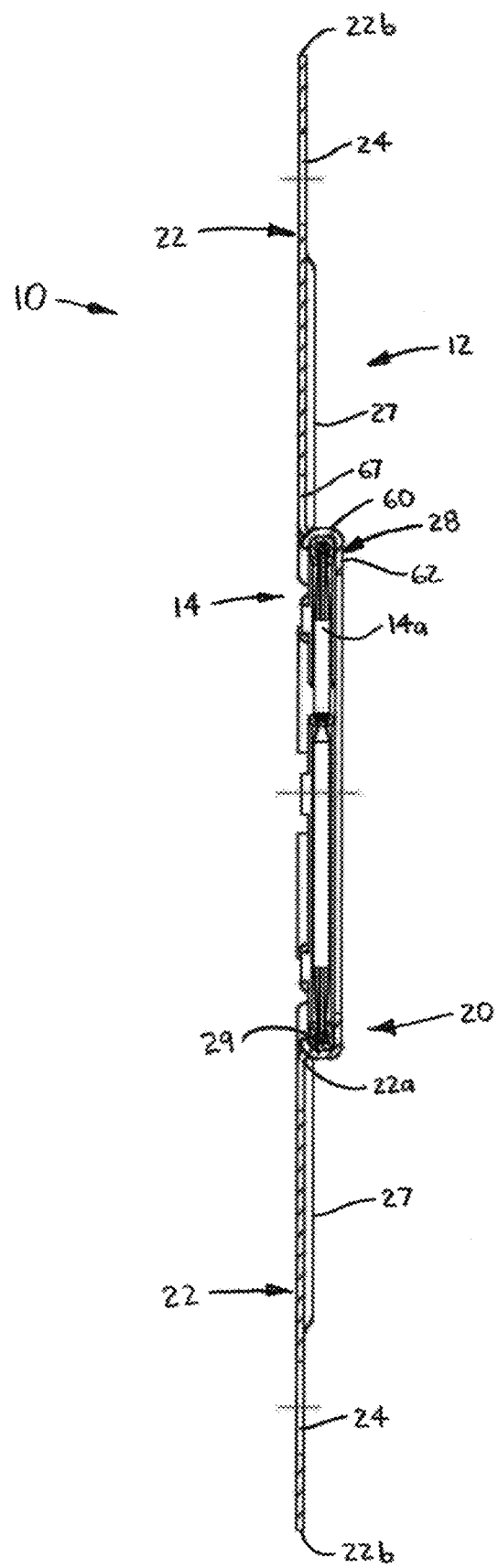
FIG. 20 is an axial cross-sectional view of the conductor assembly of FIG. 17.
Figure 21:
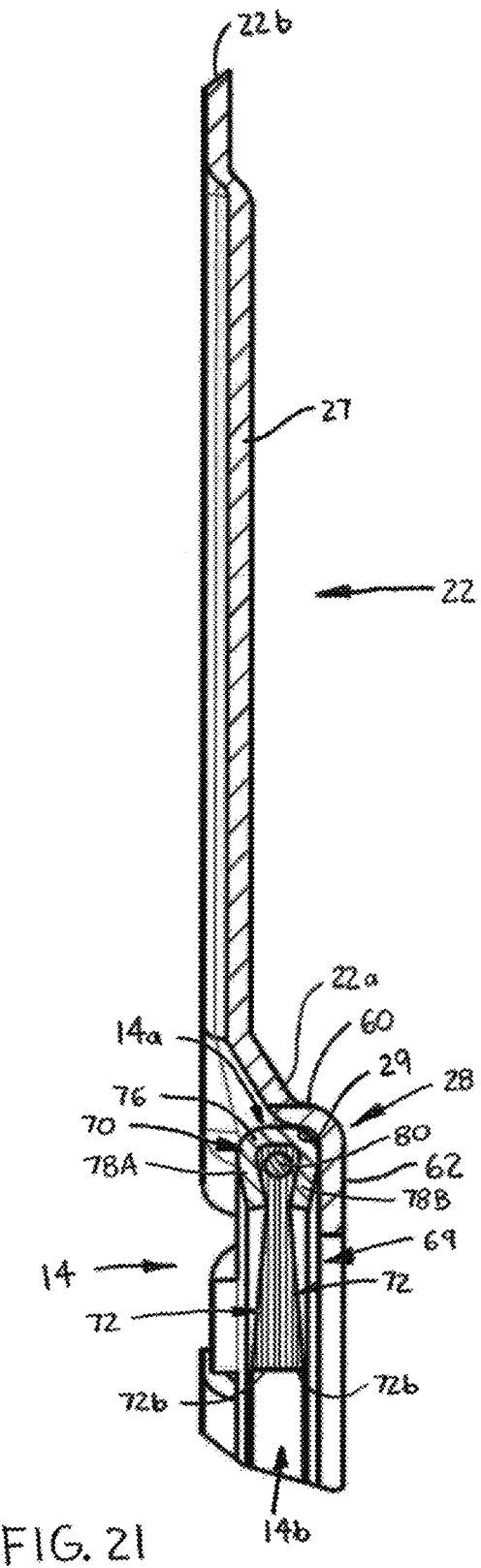
FIG. 21 is another, partial axial cross-sectional view of the conductor assembly of FIG. 17, shown extending through a stiffening rib.

Referring to FIGS. 17-19, as discussed above, each mounting lug 22 includes at least one stiffening rib 27 extending radially between the central hub 28 and an outer radial end 22b of the mounting lug 22. Preferably, each lug 22 includes two ribs 27 spaced apart across the circumferential width of the lug 22. As with the stiffening flanges 26, the ribs 27 function to increase the rigidity of the base plate 12 to reduce any potential vibration of the conductive assembly 10. Further, each mounting lug 22 also preferably includes a clearance opening 67 extending radially outwardly from the lug inner radial end 22a and adjacent to a separate one of the retainer tabs 64.

Referring now to FIGS. 4, 5 and 21-23, in both embodiments of the conductor assembly 10, the inner conductor 14 is preferably a conductive brush assembly 69 as mentioned above, which includes an outer, annular conductive retainer 70 and a plurality of conductive fibers 72 extending radially inwardly from the annular retainer 70 and configured to engage with the shaft 3. Preferably, the fibers 72 engage with an interference (i.e., by bending of the fibers 17) of up to five millimeters (5 mm) diametrically. Each conductive fiber 72 is preferably formed of carbon but may alternatively be formed of a metallic material (e.g., copper, aluminum), a conductive polymeric material or any other appropriate material.

Further, the annular conductive retainer 70 has a closed outer radial end 70a providing the conductor outer radial end 14b, an open inner radial end 70b, an annular channel 74 extending radially outwardly from the inner radial end 70b and two circumferential ends 71A, 71B. Preferably, the annular conductive retainer 70 is formed so as to include an outer base wall 76 and a pair of sidewalls 78A, 78B extending radially inwardly from the base wall 76 and defining the circumferential annular channel 74. Also, the annular retainer 70 is preferably formed of a conductive metallic material, most preferably aluminum, but may be formed of another metallic material such as steel or copper, a conductive polymeric material, or any other electrically conductive material.

Further, the plurality of conductive fibers 72 are spaced circumferentially about the centerline $L_C$ of the conductor 14 and are preferably evenly distributed along the entire arcuate perimeter (not indicated) between the circumferential ends 71A, 71B of the annular retainer 70. Each conductive fiber 72 has an outer radial end 72a disposed within the channel 76 of the retainer 74 and at least one inner radial end 72b engageable with the shaft 3. Preferably, the annular conductor 14 further includes an annular conductive wire 80 disposed within the retainer channel 74 and formed generally as a hoop. Each conductive fiber 72 is bent about the annular wire/hoop 80 such that each fiber 72 has two inner radial ends 72b engageable with the shaft 3 and is generally U-shaped or V-shaped.

Although the conductor 14 preferably includes the annular retainer 70 and the plurality of conductive fibers 72, the conductor 14 may be formed in any other appropriate manner. For example, the conductor 14 may be formed as an arcuate solid member (not shown) formed of a flexible, electrically conductive polymeric material, graphite or another electrically conductive material.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An electrically conductive assembly for preventing current flow through the raceways of a bearing having an inner ring disposed about a shaft and an outer ring disposed within a bore of an outer member, the shaft or the outer member being rotatable about a central axis through the shaft, the outer member having a radial exterior mounting surface spaced radially outwardly from the bore, the electrically conductive assembly comprising:
    a base plate formed of a conductive material, having a centerline coaxial with the central axis and including an annular main body with an inner radial end and an outer radial end, at least one integral mounting lug projecting radially outwardly from an inner radial end integral with the outer radial end of the annular main body to an outer radial end spaced radially outwardly and apart from the inner radial end of the mounting lug and the outer radial end of the annular main body, the at least one integral mounting lug being configured to connect with the radial exterior mounting surface of the outer member to secure the electrically conductive assembly to the outer member at a position spaced axially from the bearing, and at least one stiffening flange extending axially from and at least partially circumferentially about at least one of the inner radial end of the annular main body, the outer radial end of the annular main body and an outer perimeter of at least one of the two mounting lugs; and
    an inner annular conductor connected with the base plate and having an inner radial end engageable with the shaft such that an electrically conductive path extends between the shaft and the outer member through the inner annular conductor and the base plate;
    wherein the at least one stiffening flange includes at least one inner stiffening flange extending axially from the inner end of the annular main body and at least one outer stiffening flange extending axially from the base plate outer radial end and/or from the outer perimeter of the at least one integral mounting lug.

2. The electrically conductive assembly as recited in claim 1, wherein the annular main body includes a first axial end and an opposing second axial end, the at least one outer stiffening flange extends in a first axial direction from the first axial end of the annular main body and the at least one inner stiffening flange extends in a second, opposing axial direction from the second axial end of the annular main body.

3. The electrically conductive assembly as recited in claim 1, wherein the at least one stiffening flange includes an inner stiffening flange, the inner stiffening flange being continuous and extending entirely about the centerline of the base plate.

4. The electrically conductive assembly as recited in claim 1, wherein the at least one integral mounting lug includes two mounting lugs and the at least one stiffening flange includes at least one outer stiffening flange, the at least one outer stiffening flange including one of:
    a continuous outer stiffening flange extending about the entire perimeter of each one of the two lugs and about two sections of the outer radial end of the annular main body between the two mounting lugs;
    a first outer stiffening flange extending about an entire perimeter of one of the two mounting lugs and partially about the outer end of the annular main body and a second outer stiffening flange extending an entire perimeter of the other one of the two mounting lugs and partially about the outer end of the annular main body;
    a continuous outer stiffening flange extending about at least a portion of the perimeter of a first one of the two mounting lugs, about a portion of the outer radial end of the annular main body and about a portion of the perimeter of the other one of the two mounting lugs; and
    a first outer stiffening flange extending about a portion of the perimeter of one of the two mounting lugs and partially about the outer end of the annular main body and a second outer stiffening flange extending about a portion of the other one of the two mounting lugs and partially about the outer end of the annular main body.

5. The electrically conductive assembly as recited in claim 1, wherein the at least one integral mounting lug has at least one of opening extending axially through the at least one integral mounting lug for receiving a fastener for connecting the base plate to the outer member.

6. The electrically conductive assembly as recited in claim 1, wherein the at least one integral mounting lug includes two separate mounting lugs spaced circumferentially apart about the centerline of the base plate by an angle, the angle having a value of about ninety degrees or about one hundred eighty degrees.

7. The electrically conductive assembly as recited in claim 1, wherein the base plate has a plurality of integral mounting tabs each extending axially from the annular main body and spaced circumferentially about the centerline, each tab being engaged with the inner annular conductor to connect the inner annular conductor with the base plate.

8. The electrically conductive assembly as recited in claim 7, wherein each one of the plurality of integral mounting tabs is formed by cutting and bending a separate section of the annular main body such that a plurality of clearance openings are formed in the annular main body adjacent to at least a portion of the mounting tabs.

9. The electrically conductive assembly as recited in claim 1, wherein the inner annular conductor includes:
 an annular conductive retainer disposed against the base plate and having an outer radial end, an inner radial end and an annular channel extending radially outwardly from the inner radial end; and
 a plurality of conductive fibers spaced circumferentially about the centerline, each fiber having an outer radial end disposed within the annular channel of the annular conductive retainer and at least one inner radial end engageable with the shaft.

10. An electrically conductive assembly for preventing current flow through the raceways of a bearing having an inner ring disposed about a shaft and an outer ring disposed within a bore of an outer member, the shaft or the outer member being rotatable about a central axis through the shaft, the outer member having a radial exterior mounting surface spaced radially outwardly from the bore, the conductive assembly comprising:
 a base plate formed of a conductive material, having a centerline coaxial with the central axis and including an integral circular central hub, the circular central hub having a cylindrical axial portion extending continuously and circumferentially about the centerline and having an inner circumferential surface defining a circular bore and a radial portion extending radially inwardly from the cylindrical axial portion, and at least one integral mounting lug projecting entirely radially outwardly from the cylindrical axial portion of the circular central hub, the at least one integral mounting lug being configured to connect with the radial exterior mounting surface of the outer member to secure the electrically conductive assembly to the outer member at a position spaced axially from the bearing; and
 an inner annular conductor including an annular conductive retainer disposed within the bore of the circular central hub and a plurality of conductive fibers disposed within the annular conductive retainer and each having an inner radial end engageable with the shaft such that an electrically conductive path extends between the shaft and the outer member through the inner annular conductor and the base plate;
 wherein the inner annular conductor has a first axial end and an opposing second axial end, the first axial end being disposed against the radial portion of the circular central hub, and the cylindrical axial portion of the circular central hub has a first axial end and an opposing second axial end, the radial portion of the circular central hub extending inwardly from the first axial end of the cylindrical axial portion of the circular central hub, and the circular central hub further includes a plurality of integral retainer tabs spaced circumferentially about the centerline and extending radially inwardly from the second axial end of the cylindrical axial portion and disposed against the second axial end of the inner annular conductor.

11. The electrically conductive assembly as recited in claim 10, wherein the circular central hub further includes a plurality of stiffening flanges extending radially outwardly from the second axial end of the cylindrical axial portion, each one of the stiffening flanges being disposed circumferentially between a separate pair of retainer tabs.

12. The electrically conductive assembly as recited in claim 10, wherein the cylindrical axial portion of the circular central hub has first and second axial ends, the radial portion of the circular central hub extending inwardly from the first axial end and the circular central hub further includes a plurality of stiffening flanges extending radially outwardly from the second axial end of the cylindrical axial portion and spaced circumferentially about the centerline.

13. The electrically conductive assembly as recited in claim 10, wherein the at least one integral mounting lug has at least one of opening extending axially through the mounting lug for receiving a fastener for connecting the base plate to the outer member.

14. The electrically conductive assembly as recited in claim 10, wherein the at least one integral mounting lug includes at least one stiffening rib extending radially between the circular central hub and an outer radial end of the at least one integral mounting lug.

15. The electrically conductive assembly as recited in claim 10, wherein the at least one integral mounting lug includes two separate mounting lugs spaced circumferentially apart about the central axis by about one hundred eighty degrees.

16. The electrically conductive assembly as recited in claim 10, wherein the annular conductive retainer is disposed against the base plate and has an outer radial end, an inner radial end and an annular channel extending radially outwardly from the inner radial end and the plurality of conductive fibers are spaced circumferentially about the centerline, each fiber having an outer radial end disposed within the annular channel of the annular conductive retainer and at least one inner radial end engageable with the shaft.

17. An electrically conductive assembly for preventing current flow through the raceways of a bearing having an inner ring disposed about a shaft and an outer ring disposed within a bore of an outer member, the shaft or the outer member being rotatable about a central axis through the shaft, the outer member having an exterior mounting surface spaced radially outwardly from the bore, the conductive assembly comprising:
 a base plate formed of a conductive material, having a centerline coaxial with the central axis and including an annular main body with an inner radial end and an outer radial end, at least one integral mounting lug extending radially outwardly from the outer radial end of the annular main body, the at least one integral mounting lug being connectable with the exterior mounting surface of the outer member to secure the electrically conductive assembly to the outer member at a position spaced axially from the bearing, and at least one stiffening flange extending axially from and at least partially circumferentially about at least one of the inner radial end of the annular main body, the outer radial end of the annular main body and an outer perimeter of at least one of the two mounting lugs; and an inner annular conductor connected with the base plate and having an inner radial end engageable with the shaft such that an electrically conductive path extends between the shaft and the outer member through the inner annular conductor and the base plate;

wherein the at least one stiffening flange includes an inner stiffening flange, the inner stiffening flange being continuous and extending entirely about the centerline of the base plate.

18. An electrically conductive assembly for preventing current flow through the raceways of a bearing having an inner ring disposed about a shaft and an outer ring disposed within a bore of an outer member, the shaft or the outer member being rotatable about a central axis through the shaft, the outer member having a radial exterior mounting surface spaced radially outwardly from the bore, the conductive assembly comprising:

a base plate formed of a conductive material, having a centerline coaxial with the central axis and including an integral circular central hub, the circular central hub having a cylindrical axial portion extending continuously and circumferentially about the centerline and having an inner circumferential surface defining a circular bore and a radial portion extending radially inwardly from the cylindrical axial portion, and at least one integral mounting lug projecting entirely radially outwardly from the cylindrical axial portion of the circular central hub, the at least one integral mounting lug being configured to connect with the radial exterior mounting surface of the outer member to secure the electrically conductive assembly to the outer member at a position spaced axially from the bearing; and an inner annular conductor including an annular conductive retainer disposed within the bore of the circular central hub and a plurality of conductive fibers disposed within the annular conductive retainer and each having an inner radial end engageable with the shaft such that an electrically conductive path extends between the shaft and the outer member through the inner annular conductor and the base plate;

wherein the at least one integral mounting lug includes at least one stiffening rib extending radially between the circular central hub and an outer radial end of the at least one integral mounting lug.

\* \* \* \* \*